US012111585B2

(12) United States Patent
Fukui et al.

(10) Patent No.: US 12,111,585 B2
(45) Date of Patent: Oct. 8, 2024

(54) IMAGE FORMING APPARATUS AND PROCESS UNIT

(71) Applicant: CANON KABUSHIKI KAISHA, Tokyo (JP)

(72) Inventors: Yuichi Fukui, Kanagawa (JP); Shinichi Nishida, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/505,161

(22) Filed: Nov. 9, 2023

(65) Prior Publication Data

US 2024/0077811 A1 Mar. 7, 2024

Related U.S. Application Data

(63) Continuation of application No. 17/992,021, filed on Nov. 22, 2022, now Pat. No. 11,841,634.

(30) Foreign Application Priority Data

Nov. 30, 2021 (JP) ................................ 2021-194744

(51) Int. Cl.
*G03G 15/08* (2006.01)
*G03G 21/16* (2006.01)
*G03G 21/18* (2006.01)

(52) U.S. Cl.
CPC ..... *G03G 15/0808* (2013.01); *G03G 21/1633* (2013.01); *G03G 21/1647* (2013.01); *G03G 21/1825* (2013.01)

(58) Field of Classification Search
CPC ........... G03G 15/0808; G03G 15/0856; G03G 15/0867; G03G 15/0879; G03G 15/0889;
(Continued)

(56) References Cited

U.S. PATENT DOCUMENTS 7,162,181 B2 1/2007 Maeshima et al.
7,899,364 B2 3/2011 Chadani et al.
(Continued)

FOREIGN PATENT DOCUMENTS

EP 0833229 A2 4/1998
EP 1115039 A2 7/2001
(Continued)

OTHER PUBLICATIONS

European Search Report dated May 8, 2023, in related European Patent Application No. 22209910.3-1020.

*Primary Examiner* — Sophia S Chen
(74) *Attorney, Agent, or Firm* — VENABLE LLP

(57) ABSTRACT

A photosensitive member unit includes a photosensitive member and a drive receiving portion receiving a driving force for rotating the photosensitive member; a developing unit joined to the photosensitive member unit so as to be movable relative to the photosensitive member unit between a first position in which a developing roller is in contact with the photosensitive member and a second position in which the developing roller is spaced from the photosensitive member; and a transmission member transmitting the driving force to the developing unit, wherein the developing unit has a driven member driven by the transmission member, and the transmission member is configured to engage with the driven member to drive the driven member with the developing unit located in the first position, and to engage with the driven member to drive the driven member with the developing unit located in the second position.

12 Claims, 22 Drawing Sheets

(58) Field of Classification Search
CPC ........... G03G 21/1633; G03G 21/1647; G03G 21/1825; G03G 21/186
See application file for complete search history.

(56) References Cited

U.S. PATENT DOCUMENTS

| | | | | |
|---|---|---|---|---|
| 8,335,454 | B2 | 12/2012 | Chadani et al. | |
| 8,442,416 | B2 | 5/2013 | Chadani et al. | |
| 8,447,209 | B2 | 5/2013 | Chadani et al. | |
| 8,583,007 | B2 | 11/2013 | Chadani et al. | |
| 8,588,647 | B2 | 11/2013 | Chadani et al. | |
| 8,639,160 | B2 | 1/2014 | Chadani et al. | |
| 9,134,688 | B2 | 9/2015 | Chadani et al. | |
| 9,581,958 | B2 | 2/2017 | Chadani et al. | |
| 9,880,517 | B2 | 1/2018 | Maeshima et al. | |
| 9,983,542 | B2 | 5/2018 | Chadani et al. | |
| 10,401,783 | B2 | 9/2019 | Chadani et al. | |
| 10,613,476 | B2 | 4/2020 | Chadani et al. | |
| 10,795,309 | B2 | 10/2020 | Chadani et al. | |
| 10,795,311 | B2 | 10/2020 | Kamoshida et al. | |
| 11,016,438 | B2 | 5/2021 | Kamoshida et al. | |
| 11,131,959 | B2 | 9/2021 | Chadani et al. | |
| 2020/0292960 | A1* | 9/2020 | Suzuki ............... | G03G 15/0867 |
| 2020/0292966 | A1* | 9/2020 | Umeda .............. | G03G 15/0856 |
| 2021/0325821 | A1 | 10/2021 | Ikegami et al. | |
| 2021/0382434 | A1 | 12/2021 | Morioka et al. | |

FOREIGN PATENT DOCUMENTS

| | | | |
|---|---|---|---|
| EP | 3098667 | A1 | 11/2016 |
| EP | 3258323 | A1 | 12/2017 |
| JP | 3789122 | B2 | 6/2006 |
| JP | 2008-170944 | A | 7/2008 |
| JP | 2011-065181 | A | 3/2011 |
| JP | 2014-134788 | A | 7/2014 |
| JP | 2020-079964 | A | 5/2020 |
| JP | 2020-154313 | A | 9/2020 |
| JP | 2002-196585 | A | 7/2022 |

* cited by examiner

IMAGE FORMING APPARATUS AND PROCESS UNIT

This application is a continuation of application Ser. No. 17/992,021, filed Nov. 22, 2022.

BACKGROUND OF THE INVENTION

Field of the Invention

The present invention relates to an image forming apparatus and a process unit.

Description of the Related Art

Japanese Patent Application Publication No. 2020-079964 discloses a configuration of an image forming apparatus in which a rotational force is transmitted from the apparatus main body of the image forming apparatus to a coupling member on a photosensitive drum, and the rotational force is transmitted to a unit including a developing roller via the developing roller. Japanese Patent No. 3789122 discloses a configuration in which a rotational force is transmitted from an apparatus main body to each of a photosensitive drum and a developing roller. Japanese Patent Application Publication No. 2020-154313 discloses a configuration in which a rotational force is transmitted from an apparatus main body to each of a photosensitive drum and a developing roller and a unit including the developing roller is movable such that the developing roller is separated from the photosensitive drum.

SUMMARY OF THE INVENTION

In the configuration of the '964 publication, while the developing roller is separated from the photosensitive drum (photosensitive member), the driving force that drives the photosensitive member is not transmitted to the unit including the developing roller. It is an objective of the present invention to transmit a driving force that drives a photosensitive member to a developing unit including a developing roller with the developing roller separated from the photosensitive member.

According to an aspect of the present invention, a process unit includes a photosensitive member unit including a photosensitive member on which an electrostatic latent image is to be formed and a drive receiving portion configured to receive a driving force for rotating the photosensitive member; a developing unit that is joined to the photosensitive member unit so as to be movable relative to the photosensitive member unit and includes a developing roller configured to develop the electrostatic latent image with a developer, wherein the developing unit is configured to be movable relative to the photosensitive member unit between a first position in which the developing roller is in contact with the photosensitive member and a second position in which the developing roller is spaced from the photosensitive member; and a transmission member configured to transmit the driving force received by the drive receiving portion to the developing unit, wherein the developing unit has a driven member configured to be driven by the transmission member, and the transmission member is configured to engage with the driven member to drive the driven member with the developing unit located in the first position, and to engage with the driven member to drive the driven member with the developing unit located in the second position.

According to the present invention, a driving force that drives a photosensitive member can be transmitted to a developing unit including a developing roller with the developing roller separated from the photosensitive member.

Further features of the present invention will become apparent from the following description of exemplary embodiments with reference to the attached drawings.

DESCRIPTION OF THE EMBODIMENTS

Figure 1A:
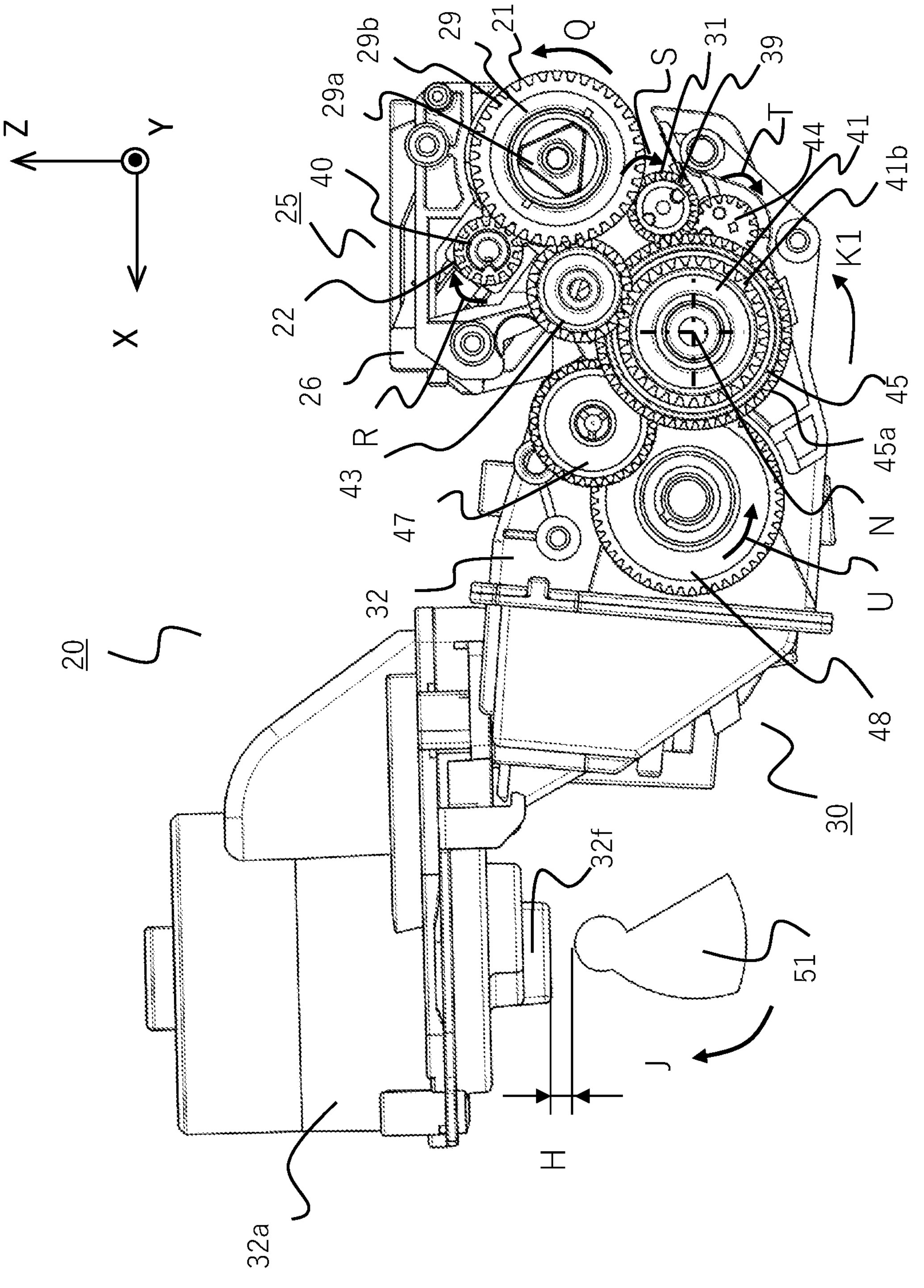
FIG. 1A is a side view of a process cartridge according to a first embodiment.

Referring to the drawings, exemplary embodiments for carrying out the present invention are now described.

First Embodiment

Referring to the drawings, embodiments of an electrophotographic image forming apparatus (hereinafter referred to as an image forming apparatus) and a process unit according to the present invention are now described in detail. The image forming apparatus forms an image on a sheet-shaped recording medium, such as paper, through an electrophotographic image forming process. Examples of the image forming apparatus include an electrophotographic copier, an electrophotographic printer (e.g., a laser beam printer, an LED printer), a facsimile machine, and a word processor. The process unit includes an electrophotographic photosensitive drum (hereinafter referred to as a photosensitive drum), which serves as an image bearing member, and a process means, which acts on the photosensitive drum. The process means may be a developer carrying member (hereinafter referred to as a developing roller). In this embodiment, a process unit attached to the apparatus main body of the image forming apparatus in a detachable manner is referred to as a process cartridge. However, the present invention is also applicable to a process unit that is not detachable from the apparatus main body of the image forming apparatus.

In the following description, unless otherwise specified, the installation surface of the image forming apparatus is a horizontal plane, terms such as “above”, “upper”, and “upper part” refer to upward with respect to the direction of gravity, and terms such as “below”, “lower” and “lower part” refer to downward in the direction of gravity. In addition, unless otherwise specified, terms that describe geometric shapes and relationships, such as straight line, circle, parallel, and perpendicular, encompass shapes and relationships that deviate from the shapes and relationships that are associated with the terms and in mathematical precision, due to manufacturing tolerances or the like. Additionally, an XYZ coordinate system is defined in which an X direction is the transport direction of the recording medium in the image forming apparatus projected onto a horizontal plane, a Y direction is the direction parallel to the rotation axis of the photosensitive drum of the image forming apparatus, and a Z direction is upward with respect to the direction of gravity. As for positive and negative directions, a +X direction is the direction from the back of the image forming apparatus to the front (the surface where an operation portion and a paper feed tray are located), the +Y direction is the direction from left to right when the image forming apparatus is viewed from the front, and a +Z direction is a vertically upward direction.

Image Forming Apparatus

Figure 2A:
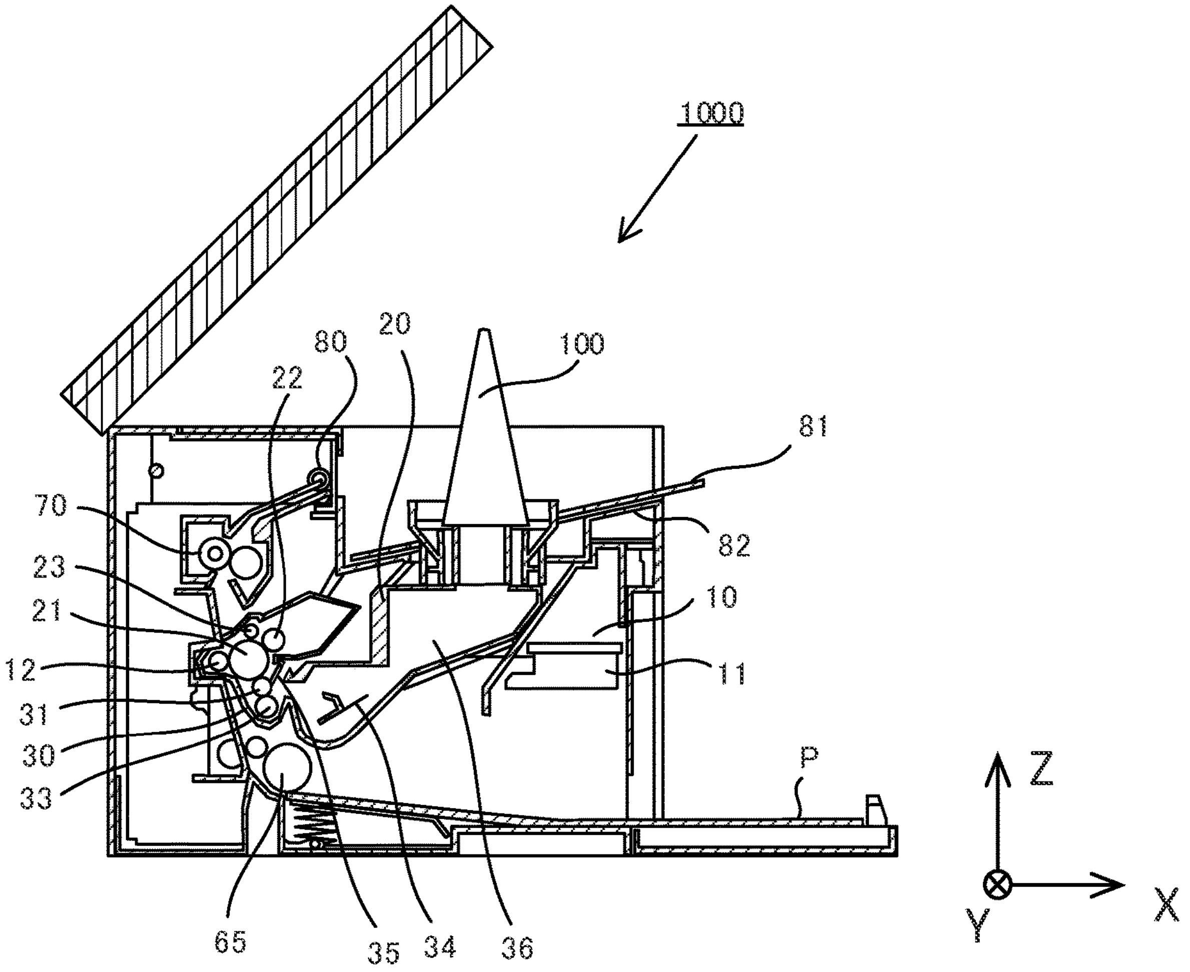
FIG. 2A is a schematic cross-sectional view of an image forming apparatus according to the first embodiment.
Figure 2B:
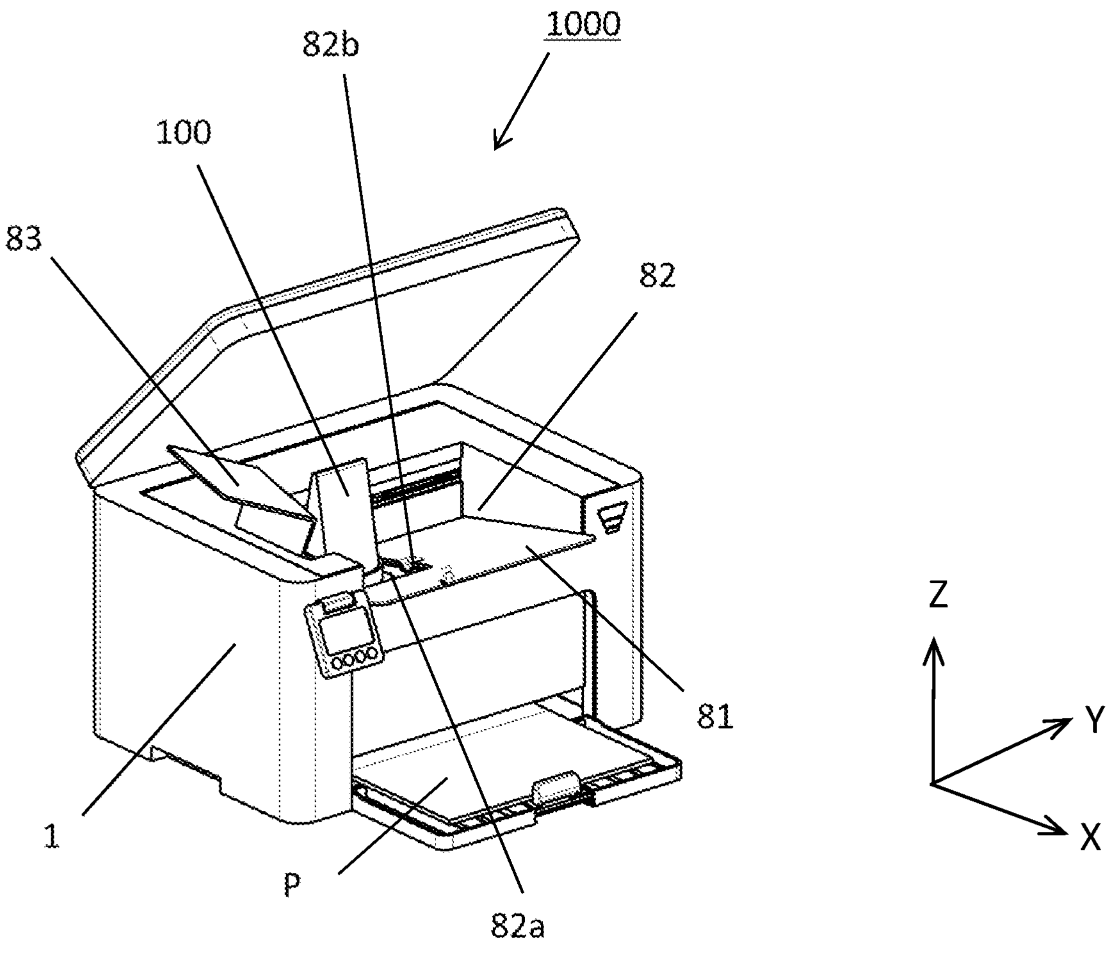
FIG. 2B is a perspective view of the image forming apparatus according to the first embodiment.
Figure 3:
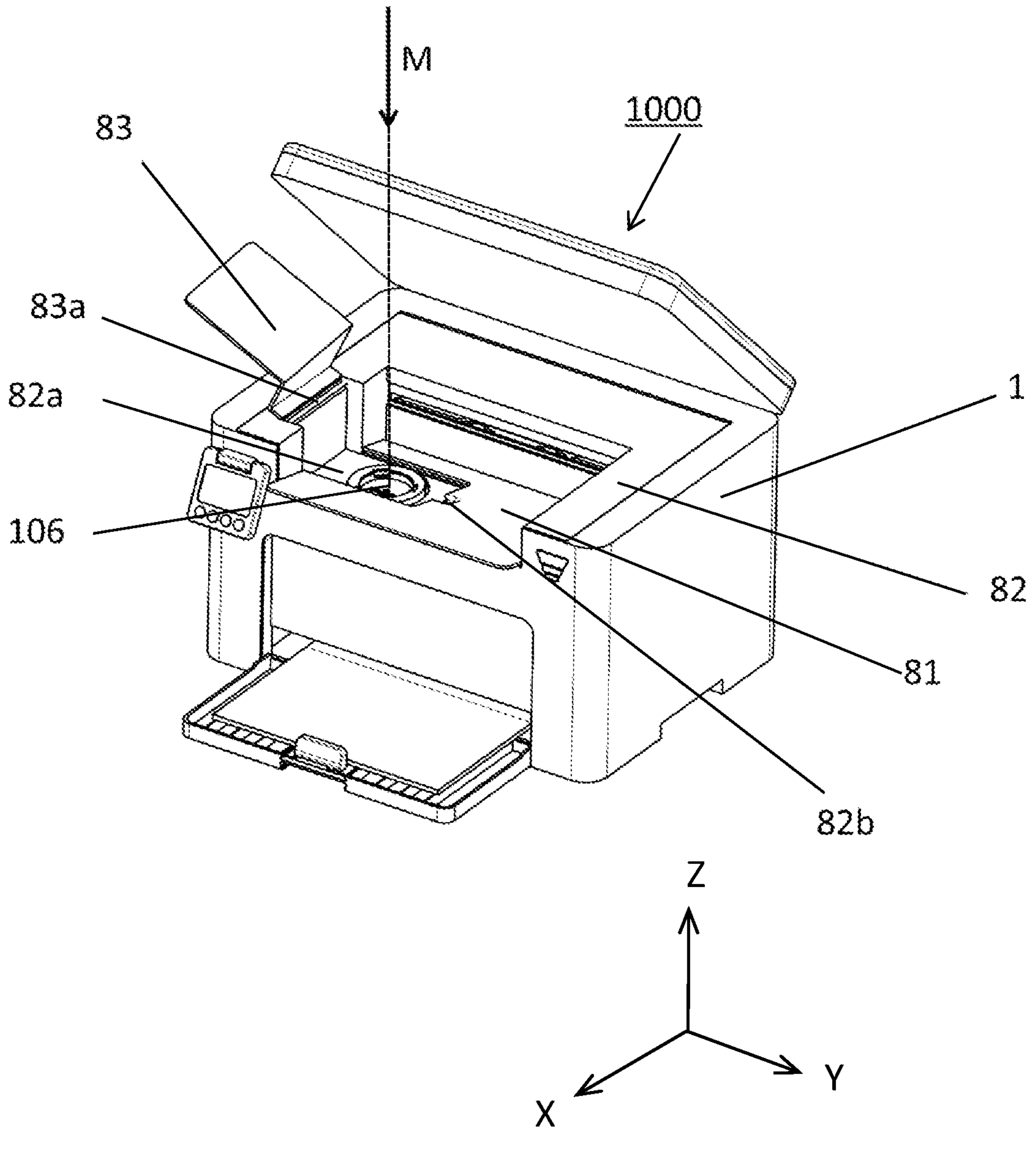
FIG. 3 is a perspective view of the image forming apparatus according to the first embodiment.
Figure 4:
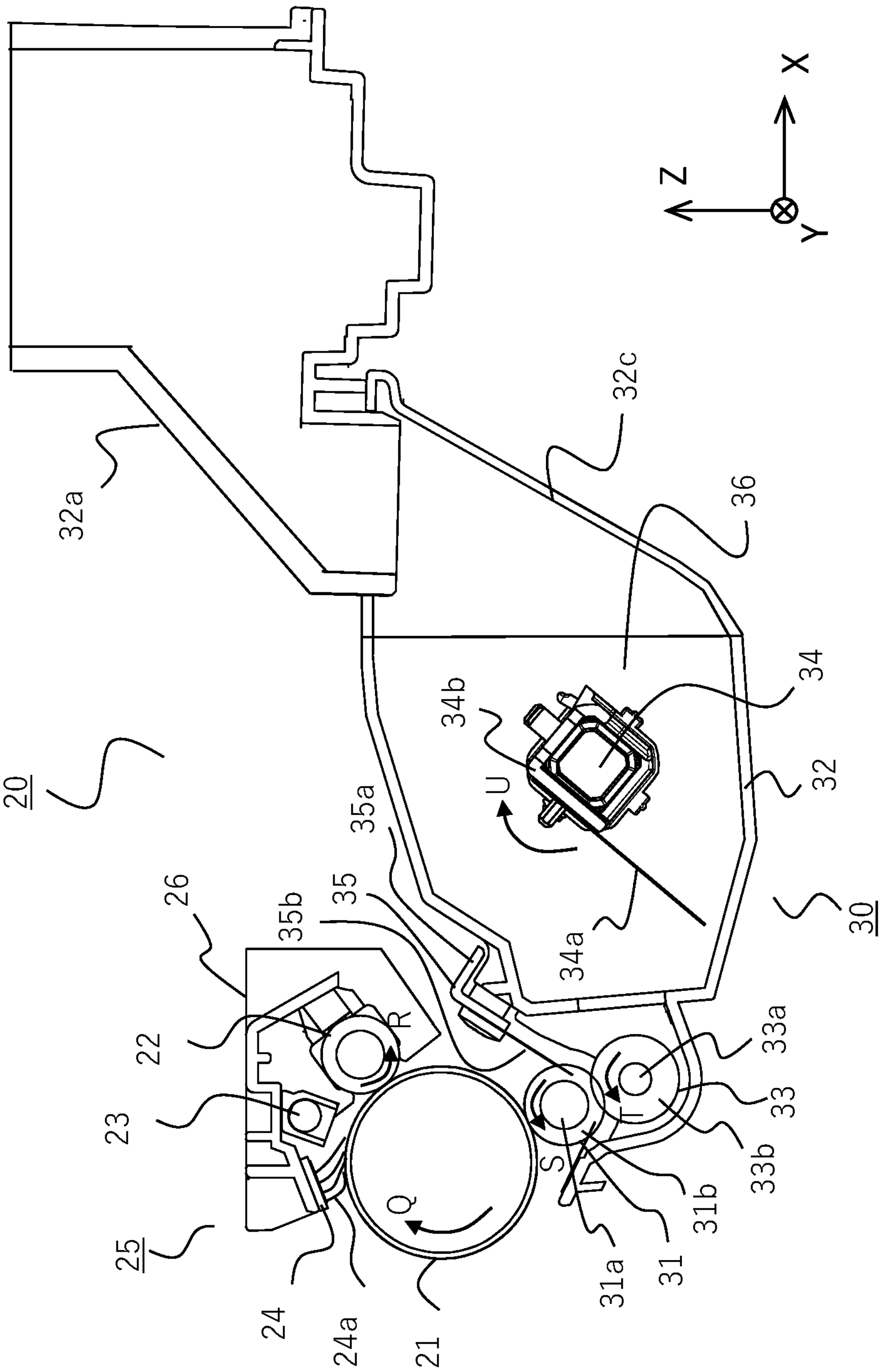
FIG. 4 is a schematic cross-sectional view of the process cartridge according to the first embodiment.

FIG. 2A is a schematic cross-sectional view showing the configuration of an image forming apparatus 1000 according to the first embodiment. FIG. 2B is a perspective view of the image forming apparatus 1000. The image forming apparatus 1000 includes an apparatus main body 1 and a toner pack 100 (toner container, toner cartridge), which is attachable to the apparatus main body 1. FIG. 3 is a perspective view of the apparatus main body 1 without the toner pack 100 attached. The toner pack 100 is attached to an attachment portion 106 of the apparatus main body 1 shown in FIG. 3 and contains toner for replenishing the apparatus main body 1. The toner pack 100 is moved in an attachment direction M shown in FIG. 3 to be attached. FIG. 4 is a schematic cross-sectional view of a process cartridge 20 placed in the apparatus main body 1.

Apparatus Main Body

The image forming apparatus 1000 is a monochrome printer, which forms an image on a recording material P based on image information input from an external device. The recording material P may be various sheets of different materials, including paper such as plain paper and thick paper, plastic film such as overhead projector sheets, sheets of special shapes such as envelopes and index paper, and cloth.

The apparatus main body 1 of the image forming apparatus 1000 includes an image forming portion 10 for forming a toner image on the recording material P, a pickup roller 65 for feeding the recording material P to the image forming portion 10, and a fixing portion 70 for fixing the toner image formed by the image forming portion 10 on the recording material P, and a pair of discharge rollers 80.

The image forming portion 10 includes a scanner unit 11, a process cartridge 20, and a transfer roller 12 for transferring a toner image, which is a developer image formed on a photosensitive drum 21 of the process cartridge 20, onto the recording material P.

As shown in FIG. 4, the process cartridge 20, which is detachable from the apparatus main body 1 of the image forming apparatus 1000, includes a drum unit 25 and a developing unit 30. The drum unit 25 is a photosensitive member unit having the photosensitive drum 21, which is a photosensitive member on which an electrostatic latent image is formed based on image information. The drum unit 25 includes the photosensitive drum 21, a charging roller 22, a pre-exposure portion 23, and a brush unit 24. The developing unit 30 has a developing roller 31 that develops the electrostatic latent image with toner as a developer.

The photosensitive drum 21 is a cylindrical photosensitive member. The photosensitive drum 21 has a drum-shaped substrate made of aluminum and a photosensitive layer formed of a negatively charged organic photosensitive member on the substrate. A motor drives and rotates the photosensitive drum 21 at a predetermined process speed in a predetermined rotational direction (the direction of arrow Q in FIG. 4).

The charging roller 22 as a charging member is rotatably in contact with the photosensitive drum 21 and forms a charging portion. When a predetermined charging voltage is applied to the charging roller 22 by a charging high-voltage power supply, the surface of the photosensitive drum 21 is uniformly charged to a predetermined potential. The photosensitive drum 21 is negatively charged by the charging roller 22. The pre-exposure portion 23 eliminates the surface potential of the photosensitive drum 21 before the photosensitive drum 21 reaches the charging portion to achieve stable electric discharge in the charging portion. The brush unit 24 has a brush portion 24*a*, which is formed of piled fabric and in contact with the photosensitive drum 21 to collect paper dust and the like generated by the recording material P.

The scanner unit 11 as an exposure means scans and exposes the surface of the photosensitive drum 21 by irradiating, using a polygon minor, the photosensitive drum 21 with laser light corresponding to image information input from an external device. This exposure forms an electrostatic latent image on the surface of the photosensitive drum 21 corresponding to the image information. The scanner unit 11 is not limited to a laser scanner apparatus and may be an LED exposure apparatus having an LED array including a plurality of LEDs arranged in the longitudinal direction (rotation axis direction, Y direction) of the photosensitive drum 21.

The developing unit 30 includes the developing roller 31, serving as a developer carrying member that carries a developer, a developing container 32 (developing frame), serving as a frame of the developing unit 30, and a supply roller 33 capable of supplying the developing roller 31 with the developer. The developing container 32 rotatably supports the developing roller 31 and the supply roller 33. The developing roller 31 has a core bar 31*a* made of a metal material and a rubber portion 31*b*. The supply roller 33 has a core bar 33*a* made of a metal material and an elastic portion 33*b*. A developing blade 35, which is located at the opening of the developing container 32 where the developing roller 31 is placed, regulates the amount of toner carried by the developing roller 31.

The developing roller 31 is arranged at the opening of the developing container 32 so as to face the photosensitive drum 21. The supply roller 33 is in contact with the developing roller 31, and the supply roller 33 supplies the toner, which is the developer contained in the developing container 32, onto the surface of the developing roller 31. The supply roller 33 is not necessarily required provided that the toner can be appropriately supplied to the developing roller 31. As the developing roller 31 rotates, the toner supplied to the surface of the developing roller 31 passes through the portion facing the developing blade 35. The toner is thus shaped into a uniform thin layer and also negatively charged by frictional electrification.

The developing unit 30 uses a contact developing method and a reversal developing method as developing methods. In the contact developing method, the toner layer carried on the developing roller 31 comes into contact with the photosensitive drum 21 in a developing portion (developing region), in which the photosensitive drum 21 and the developing roller 31 face each other. The developing high-voltage power supply applies a developing voltage to the developing roller 31. Under the developing voltage, the toner carried by the developing roller 31 is transferred from the developing roller 31 to the surface of the photosensitive drum 21 according to the potential distribution on the surface of the photosensitive drum 21, thereby developing the electrostatic latent image into a toner image. In the reversal developing method, a toner image is formed by the toner adhering to the region of the surface of the photosensitive drum 21 that has been charged in a charging process and then exposed in an exposure process to reduce the amount of charge.

The developer is a non-magnetic single-component developer that is polymerized toner produced by a polymerization method, has an average particle size of 6 μm, normally has a negative charging polarity, does not contain a magnetic component, and is carried by the developing roller 31 mainly through an intermolecular force and an electrostatic force (image force). A single-component developer containing a magnetic component may also be used. Furthermore, in addition to the toner particle, the single-component developer may contain additives (for example, wax or fine silica particles) for adjusting the fluidity and charging performance of the toner. Alternatively, a two-component developer composed of non-magnetic toner and a magnetic carrier may be used as the developer. When a magnetic developer is used, the developer carrying member may be a columnar developing sleeve having a magnet therein.

The developing container 32 has a toner containing chamber 36 for containing toner. A stirring member 34 (toner transporting member) is provided in the toner containing chamber 36. The stirring member 34 is rotatably supported in the toner containing chamber 36, stirs the toner in the developing container 32, and transports the toner toward the developing roller 31 and the supply roller 33. The stirring member 34 also functions to circulate the toner that is unused for development and removed from the developing roller 31 in the developing container 32 so that the toner in the developing container 32 becomes uniform. The stirring member 34 is not limited to a rotational member. For example, a stirring member that swings may be used.

The developing container 32 also has a toner receiving portion 32*a* having an interior in communication with the toner containing chamber 36.

An image forming operation of the apparatus main body 1 is now described. When an image forming command is input to the apparatus main body 1, the image forming portion 10 starts an image forming process based on image information input from an external computer connected to the apparatus main body 1. The scanner unit 11 irradiates the photosensitive drum 21 with laser light based on the input image information. At this time, the photosensitive drum 21 has already been charged by the charging roller 22, and the laser light irradiation forms an electrostatic latent image on the photosensitive drum 21. Then, the developing roller 31 develops this electrostatic latent image to form a toner image on the photosensitive drum 21.

In parallel with the image forming process described above, the recording material P is sent out by the pickup roller 65 and transported toward the transfer nip formed by the transfer roller 12 and the photosensitive drum 21.

A transfer high-voltage power supply applies a transfer voltage to the transfer roller 12, thereby transferring the toner image carried by the photosensitive drum 21 to the recording material P. While the recording material P having the toner image transferred thereon passes through the fixing portion 70, the toner image is heated and pressurized. This melts and then hardens the toner particle, thereby fixing the toner image on the recording material P. After passing through the fixing portion 70, the recording material P is discharged to the outside of the apparatus main body 1 (outside of the apparatus) by the pair of discharge rollers 80 as a discharging means and loaded onto a discharge tray 81 as a loading portion formed in the upper part of the apparatus main body 1. The toner that has not been transferred to the recording material P and thus remains on the photosensitive drum 21 is charged by the charging roller 22 and collected by the developing roller 31. The collected toner is reused to perform another image forming process. A configuration that collects the toner remaining on the photosensitive drum 21 with the developing roller 31 as described above requires a smaller force to rotate the photosensitive drum 21 as compared with a configuration that collects the toner remaining on the photosensitive drum 21 with what is referred to as a cleaning blade or the like.

The apparatus main body 1 includes a top cover 82 in its upper part, and the discharge tray 81 is formed on the upper surface of the top cover 82. As shown in FIGS. 2B and 3, the top cover 82 includes an opening and closing member 83, which is supported to be openable and closable about a rotation axis 83*a* extending in the front-rear direction (X direction). The discharge tray 81 of the top cover 82 has an opening portion 82*a* opening upward. As shown in FIG. 3, the attachment portion 106, to which the toner pack 100 is attached, is exposed from the opening portion 82*a*. The opening portion 82*a* allows for access to the attached process cartridge 20 from the outside of the apparatus main body 1.

The opening and closing member 83 is configured to be movable between a closed position covering the attachment portion 106 so that the toner pack 100 cannot be attached to the apparatus main body 1, and an open position exposing the attachment portion 106 so that the toner pack 100 can be attached to the apparatus main body 1. The opening and closing member 83 is an opening and closing door that opens and closes the opening portion 82*a*. In the closed position, the opening and closing member 83 serves as a part of the discharge tray 81. The opening and closing member 83 and the opening portion 82*a* are formed in the left side of the discharge tray 81 as viewed from the front side of the apparatus main body 1 (in the −X direction). The front side of the apparatus main body 1 described here is the surface on the upstream side of the apparatus main body 1 in the direction in which the recording material P is sent out by the pickup roller 65 (−X direction). The user inserts a finger into a groove 82*b* formed in the top cover 82, catches the opening and closing member 83 with the finger, and moves the opening and closing member 83 to the left (counterclockwise as viewed from the front side) to open the opening and closing member 83.

The opening portion 82*a* of the discharge tray 81 opens so that the attachment portion 106 formed in the upper part of the apparatus main body 1 is exposed, and the user can access the attachment portion 106 by opening the opening and closing member 83. With the developing unit 30 attached to the apparatus main body 1 and the toner pack 100 attached to the attachment portion 106, the user can replenish the developing unit 30 with toner from the toner pack 100. This toner replenishing method is referred to as a direct replenishing method. While the toner pack 100 is attached to the attachment portion 106 of the apparatus main body 1, at least a part of the toner pack 100 is exposed to the outside of the apparatus main body 1.

In the direct replenishing method, when the amount of toner remaining in the process cartridge 20 becomes low, the process cartridge 20 does not need to be removed from the apparatus main body 1 or replaced with a new process cartridge. This improves the usability. Also, as compared with a configuration that replaces the entire process cartridge 20, the developing container 32 is replenished with toner at a lower cost. Furthermore, as compared even with a configuration that replaces only the developing unit 30 of the process cartridge 20, the direct replenishing method is more cost-effective because components such as various rollers and gears do not have to be replaced.

Drum Unit Configuration

Figure 5:
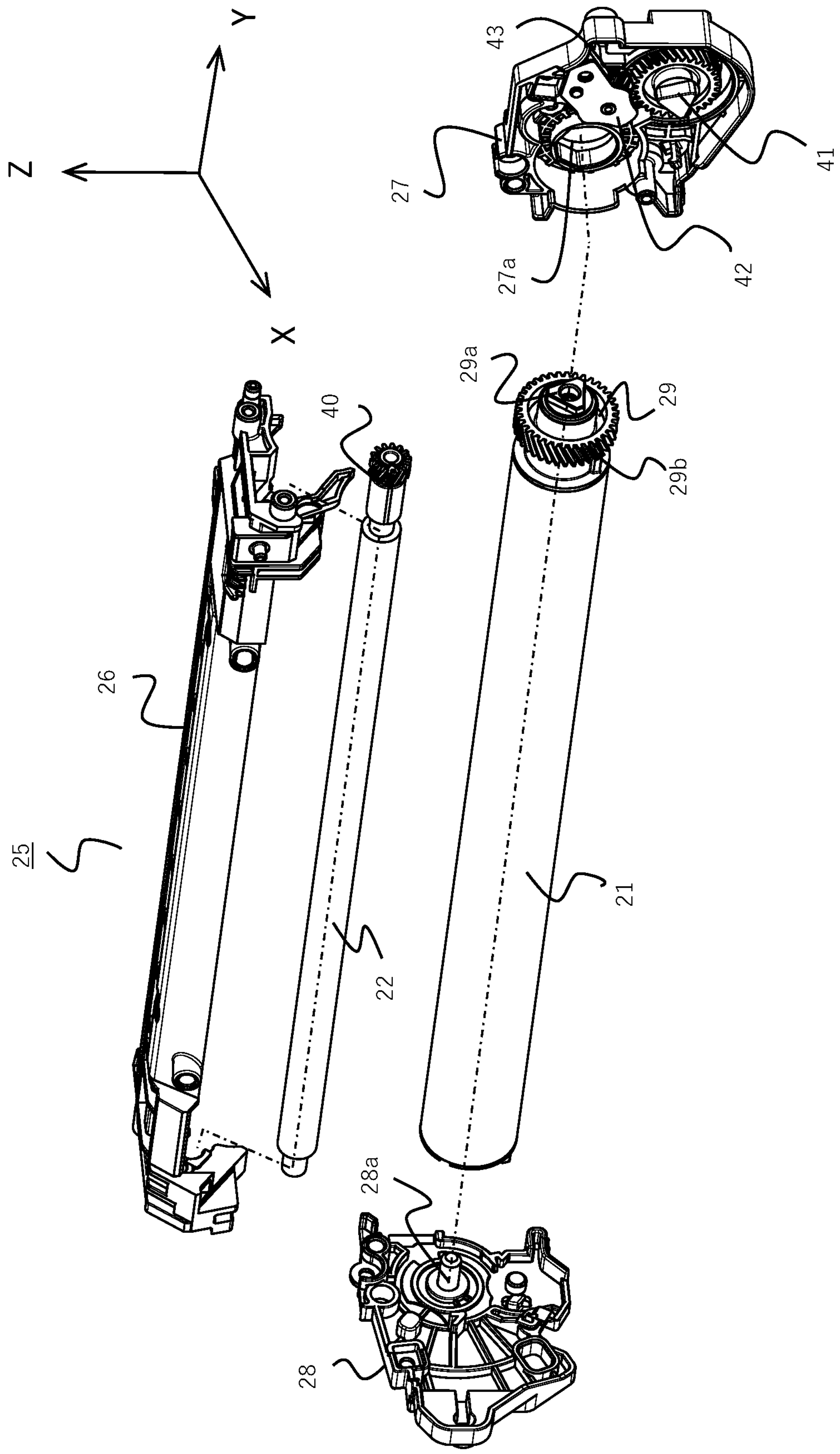
FIG. 5 is an exploded perspective view of a drum unit according to the first embodiment.

Referring to FIGS. 4 and 5, the configuration of the drum unit 25 is now described. FIG. 5 is an exploded perspective view of the drum unit 25. As shown in FIG. 5, the drum unit 25 includes the photosensitive drum 21, the charging roller 22, a drum frame 26, a drive-side cover member 27, and a non-drive-side cover member 28.

A drum driving member (drive receiving portion) 29 located at one end (drive side, +Y direction end) of the photosensitive drum 21 in the longitudinal direction (rotation axis direction, Y direction) receives a rotational force (driving force) from the apparatus main body 1 and rotates the photosensitive drum 21. The drum driving member 29 is an input means for inputting a rotational driving force received from a power source, such as a motor of the apparatus main body 1, to the photosensitive drum 21. The drum driving member 29 has a coupling portion 29*a* and a gear portion 29*b* located around the coupling portion 29*a*.

The photosensitive drum 21 is rotatably supported by the drive-side cover member 27 and the non-drive-side cover member 28 at opposite longitudinal ends of the drum unit 25. The drive-side cover member 27 has a support hole 27*a*, and the outer circumference of the coupling portion 29*a* of the drum driving member 29 is fitted in the support hole 27*a*. The drive-side cover member 27 thus supports the photosensitive drum 21. The non-drive-side cover member 28 has a columnar support portion 28*a*, which is fitted in a hole (not shown) formed in the other end in the longitudinal direction (non-drive side, −Y direction end) of the photosensitive drum 21 in the rotational center of the photosensitive drum 21. The non-drive-side cover member 28 thus supports the photosensitive drum 21. The drive-side cover member 27 and the non-drive-side cover member 28 are fixed to the drum frame 26 with screws or adhesives (not shown), for example. The drive-side cover member 27, the non-drive-side cover member 28, and the drum frame 26 function as a frame that supports the photosensitive drum 21.

A coupling (not shown) serving as a drum drive output portion of the apparatus main body 1 engages with the coupling portion 29*a* of the drum driving member 29, so that the photosensitive drum 21 rotatably placed in the drum unit 25 receives a rotational force of a drive motor (not shown) of the apparatus main body 1. This rotates the photosensitive drum 21 in the direction of arrow Q in FIG. 4 (clockwise as viewed from the non-drive side).

The charging roller 22 is supported by the drum frame 26 so as to be rotatable in contact with the photosensitive drum 21. The charging roller 22 has a charging roller gear 40 at one longitudinal end (drive side, +Y direction end), that is, on the side where the drum driving member 29 of the photosensitive drum 21 is located. The charging roller gear 40 meshes with the gear portion 29*b* of the drum driving member 29, allowing the charging roller 22 to receive the rotational force of the drive motor (not shown) of the apparatus main body 1 via the drum driving member 29 and thus rotate in the direction of arrow R in FIG. 4 (counterclockwise as viewed from the non-drive side).

Figure 6A:
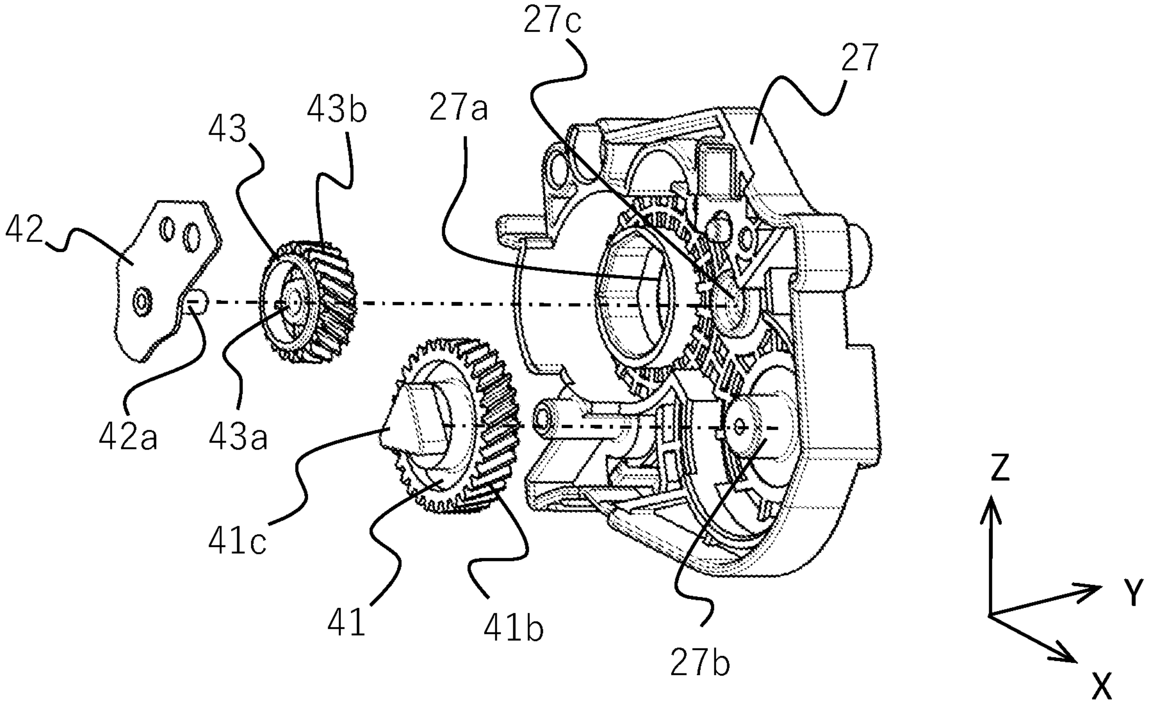
FIG. 6A is an exploded perspective view of a drive-side cover member according to the first embodiment.
Figure 6B:
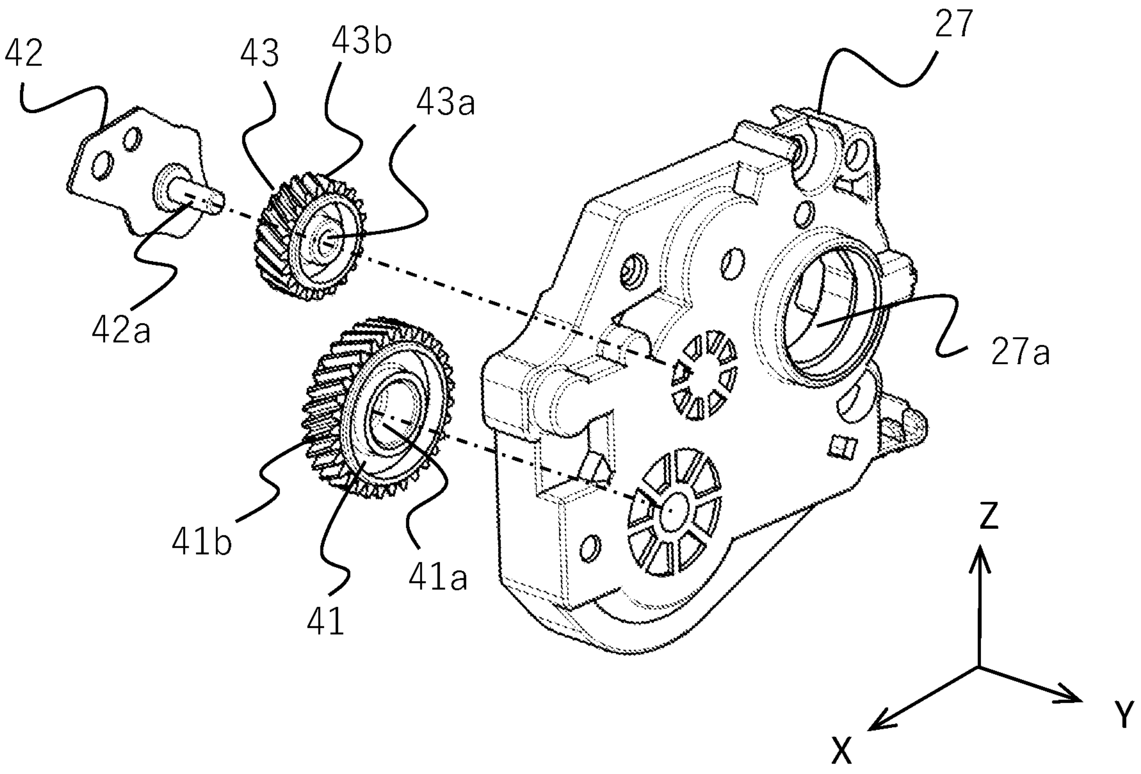
FIG. 6B is an exploded perspective view of the drive-side cover member according to the first embodiment.

FIGS. 6A and 6B are exploded perspective views of the drive-side cover member 27. As shown in FIGS. 6A and 6B, the drive-side cover member 27 has a columnar support portion 27*b* and a support hole 27*c*. The support portion 27*b* is fitted into a hole 41*a* of a transmission member 41 to rotatably support the transmission member 41. The transmission member 41 has a coupling portion 41*c*, which transmits a rotational force to a development driving member 45 supported by the developing unit 30, and a gear portion 41*b*.

A gear support member 42 shown in FIGS. 6A and 6B has a columnar support portion 42*a*. The support portion 42*a* of the gear support member 42 is fitted in a hole 43*a* of an idler gear 43 and the support hole 27*c* of the drive-side cover member 27. The gear support member 42 is fixed to the drive-side cover member 27. The drive-side cover member 27 thus rotatably supports the idler gear 43. The gear support member 42 is fixed to the drive-side cover member 27 with a screw, adhesive, or the like (not shown). The idler gear 43 has a gear portion 43*b*. The gear portion 43*b* of the idler gear 43, which is rotatably supported by the drive-side cover member 27, is configured to mesh with the gear portion 41*b* of the transmission member 41. This allows the idler gear 43 to transmit a rotational force to the transmission member 41. Also, referring to FIG. 5, when the drive-side cover member 27 is fixed to the drum frame 26, the gear portion 29*b* of the drum driving member 29 meshes with the gear portion 43*b* of the idler gear 43, allowing the drum driving member 29 to transmit a rotational force to the idler gear 43. That is, the rotational force received by the drum driving member 29 from the apparatus main body 1 is transmitted to the transmission member 41 via the idler gear 43.

Developing Unit Configuration

Figure 7A:
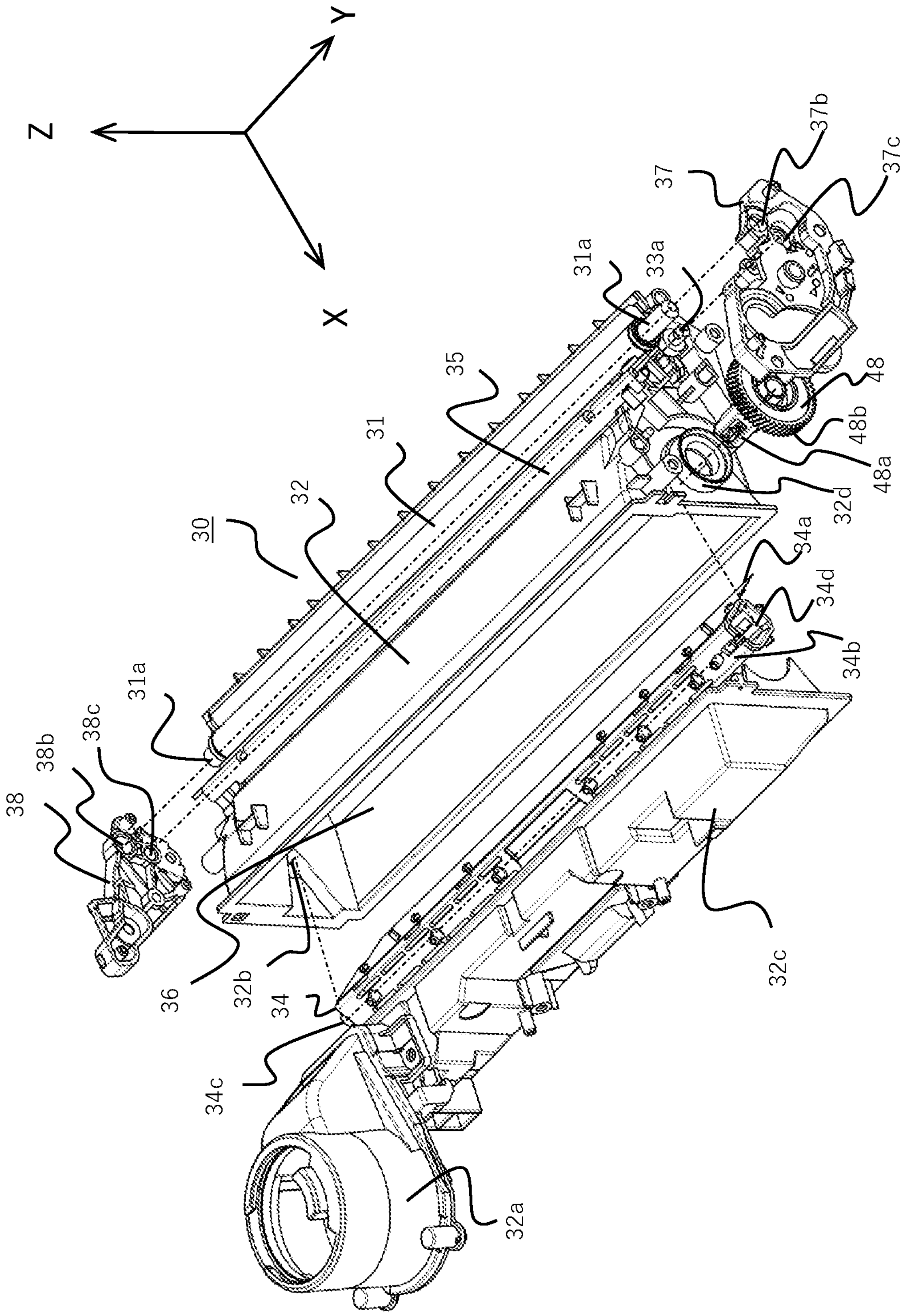
FIG. 7A is an exploded perspective view of a developing unit according to the first embodiment.
Figure 7B:
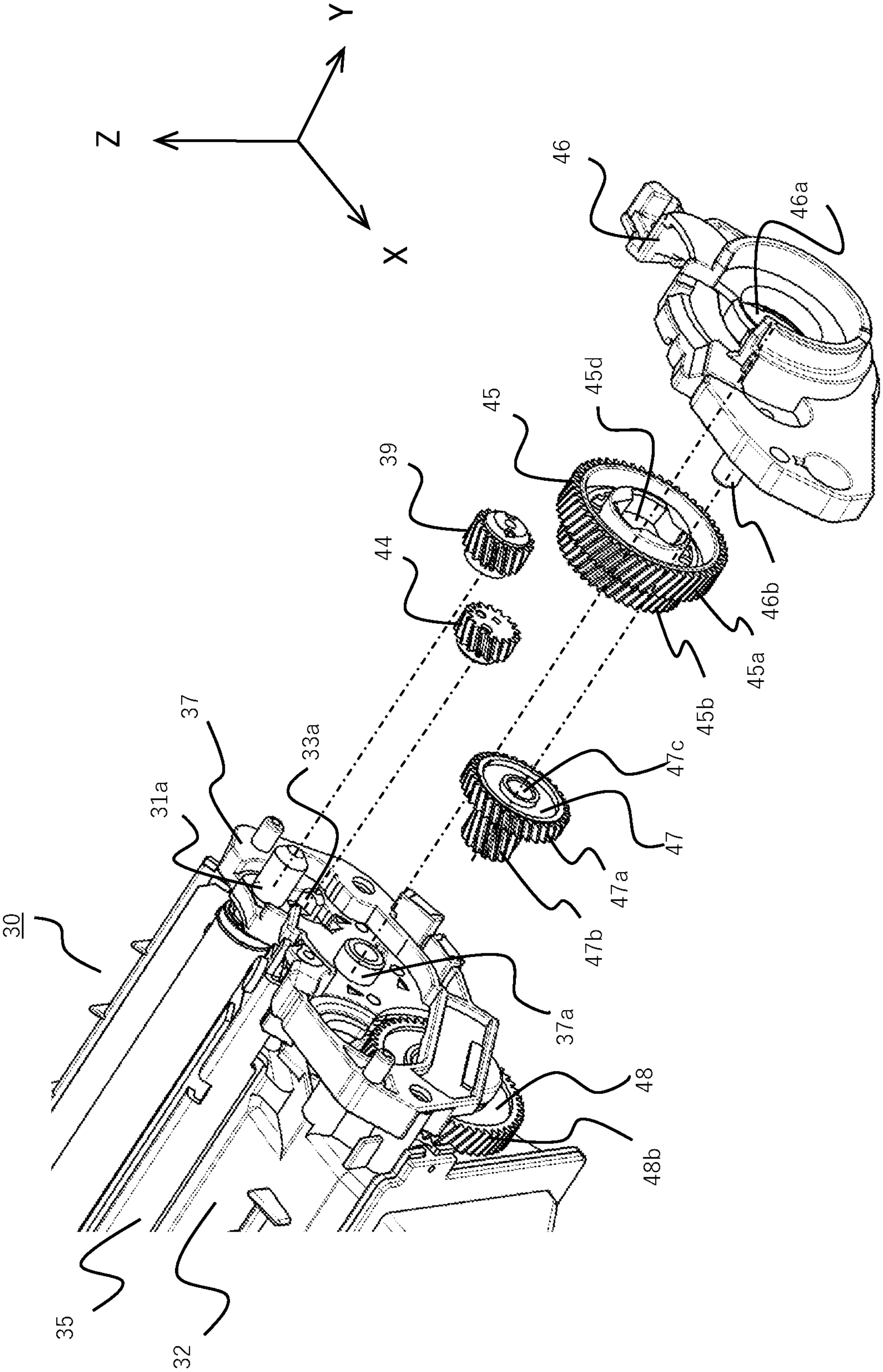
FIG. 7B is an exploded perspective view of the developing unit according to the first embodiment.

Referring to FIGS. 4, 7A, and 7B, the configuration of the developing unit 30 is now described. FIGS. 7A and 7B are exploded perspective views of the developing unit 30. FIG. 7A shows how a drive-side bearing 37 and a non-drive-side bearing 38, which support the developing roller 31, and the stirring member 34 are assembled. FIG. 7B shows how a plurality of gears supported by the developing unit 30 and a developing cover member 46 are assembled.

As shown in FIGS. 4, 7A, and 7B, the developing unit 30 includes the developing roller 31, the developing blade 35, and the developing container 32, for example. The developing container 32 has the toner containing chamber 36, which stores toner to be supplied to the developing roller 31. The developing blade 35 is formed by welding or otherwise joining an elastic member 35*b*, which is a metal sheet having a thickness of about 0.1 mm, to a support member 35*a*, which is a metal material having an L-shaped cross-section. The developing blade 35 is fixed to the developing container 32 at two locations at one end (drive side, +Y direction end) and the other end (non-drive side, −Y direction end) in the longitudinal direction (rotation axis direction, Y direction) with screws or the like. The elastic member 35*b* of the developing blade 35 is in contact with the developing roller 31 under a predetermined pressure, thereby regulating the thickness of the toner layer on the circumference surface of the developing roller 31. That is, when the developing roller 31 rotates, a frictional force is generated between the developing roller 31 and the developing blade 35, resulting in a rotation load applied to the developing roller 31.

As shown in FIG. 7A, the core bar 31*a* of the developing roller 31 is fitted in a support hole 37*b* of the drive-side bearing 37 and a support hole 38*b* of the non-drive-side bearing 38, which are attached to opposite longitudinal ends of the developing container 32. The developing unit 30 thus rotatably supports the developing roller 31. Also, the core bar 33*a* of the supply roller 33 is fitted in a support hole 37*c* of the drive-side bearing 37 and a support hole 38*c* of the non-drive-side bearing 38, and the developing unit 30 thus rotatably supports the supply roller 33. Furthermore, as shown in FIG. 7B, a developing roller gear 39 is placed at one end (drive side, +Y direction end) of the developing roller 31 in the longitudinal direction (rotation axis direction, Y direction). A rotational force that causes the core bar 31*a* to rotate the developing roller 31 is input to this developing roller gear 39. A supply roller gear 44 is placed at one end (drive side, +Y direction end) of the supply roller 33 in the longitudinal direction (rotation axis direction, Y direction). A rotational force that causes the core bar 33*a* to rotate the supply roller 33 is input to this supply roller gear 44.

Figure 8A:
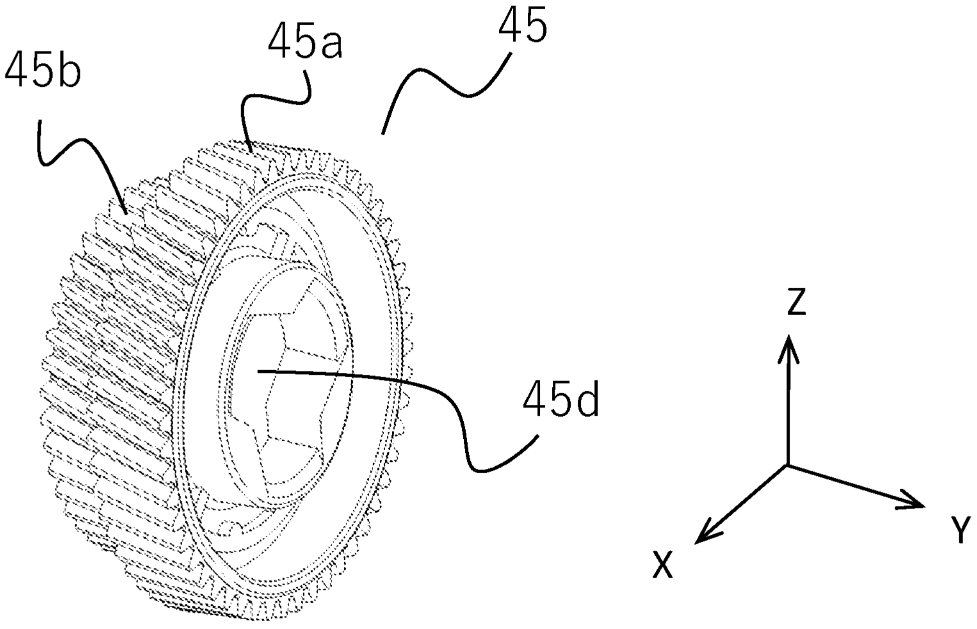
FIG. 8A is a perspective view of a development driving member according to the first embodiment.
Figure 8B:
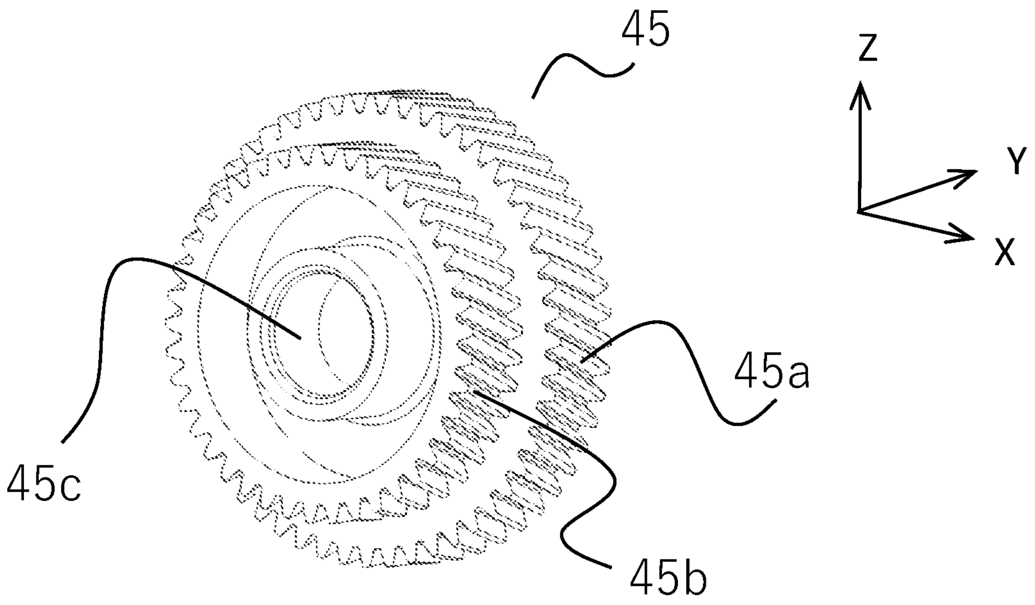
FIG. 8B is a perspective view of the development driving member according to the first embodiment.

FIGS. 8A and 8B are perspective views of the development driving member 45. As shown in FIGS. 8A and 8B, the developing unit 30 has the development driving member (transmitted member, driven member) 45, which receives a rotational force transmitted from the transmission member 41. The development driving member 45 has a coupling portion 45*d*, which engages with the coupling portion 41*c* of the transmission member 41 to transmit a rotational force. The development driving member 45 also has a first gear portion 45*a* and a second gear portion 45*b* around the coupling portion 45*d*. It also has a hole 45*c* at the inner side of the first and second gear portions 45*a* and 45*b*. That is, the transmission member 41 is configured to transmit the rotational force received by the drum driving member 29 to the development driving member 45 of the developing unit 30. As will be described below, the development driving member 45 is rotatable about a developing rotation axis N. The transmission member 41 and the development driving member 45 are arranged in a direction of the developing rotation axis N and face each other.

As shown in FIG. 7B, the drive-side bearing 37 has a columnar support portion 37*a*, which is fitted in the hole 45*c* of the development driving member 45. The developing cover member 46 has a hole 46*a*, which fits the outer circumference of the coupling portion 45*d* of the development driving member 45. In this manner, the drive-side bearing 37 and the developing cover member 46 rotatably support the development driving member 45.

The first gear portion 45*a* of the development driving member 45, which is rotatably supported by the developing unit 30 as described above, meshes with the developing roller gear 39 and transmits a rotational force to the developing roller gear 39. Also, the second gear portion 45*b* of the development driving member 45 meshes with the supply roller gear 44 and transmits a rotational force to the supply roller gear 44. That is, the rotational force received by the development driving member 45 from the transmission member 41 is transmitted to the developing roller gear 39 and the supply roller gear 44, thereby rotating the developing roller 31 in the direction of arrow S in FIG. 4 and the supply roller 33 in the direction of arrow T in FIG. 4.

The developing container 32 has the toner containing chamber 36, which is a containing portion containing toner. The toner containing chamber 36 accommodates the stirring member 34, which rotates in the containing portion to stir the developer. The stirring member 34 has a sheet-shaped stirring elastic member 34*a* and a stirring shaft 34*b* to which one end of the stirring elastic member 34*a* is fixed. As shown in FIG. 7A, a support hole 34*d* is provided at one end (drive side, +Y direction end) of the stirring shaft 34*b* in the longitudinal direction (rotation axis direction, Y direction), and a columnar support portion 34*c* is provided at the other end (non-drive side, −Y direction end). The support portion 34*c* engages with an arcuate portion 32*b* provided in the inner wall of the developing container 32, and the support hole 34*d* engages with a support portion 48*a*, which has the shape of a quadratic prism, of a stirring gear 48, which is placed from the outside of the developing container 32. Thus, the stirring member 34 placed in the toner containing chamber 36 is rotatably supported. As shown in FIG. 7A, a lid 32*c* is fixed to the developing container 32 by ultrasonic welding, an adhesive, or the like, so that the developing container 32 forms the toner containing chamber 36. A toner receiving portion 32*a*, which is placed on the lid 32*c*, defines therein a toner path communicating with the toner containing chamber 36. The toner pack 100 is placed on this toner receiving portion 32*a* to replenish the toner containing chamber 36 of the developing unit 30 with toner.

The stirring gear 48 has a gear portion 48*b*. The inner circumference of the gear portion 48*b* engages with an annular support portion 32*d* of the developing container 32 as shown in FIG. 7A and is thus rotatably supported by the developing container 32. As shown in FIG. 7B, a stirring idler gear 47 has a first gear portion 47*a*, a second gear portion 47*b*, and a hole 47*c* extending through the first and second gear portions 47*a* and 47*b*. The hole 47*c* engages with a columnar support portion 46*b* of the developing cover member 46 fixed to the developing container 32 and is thus rotatably supported. The first gear portion 47*a* of the stirring idler gear 47, which is placed on the developing container 32, meshes with the second gear portion 45*b* of the development driving member 45, and the second gear portion 47*b* meshes with the gear portion 48*b* of the stirring gear 48. That is, the rotational force received by the development driving member 45 is transmitted to the stirring gear 48 via the stirring idler gear 47, rotating the stirring member 34 in the direction of arrow U in FIG. 4.

Combination of Drum Unit 25 and Developing Unit 30

Figure 9A:
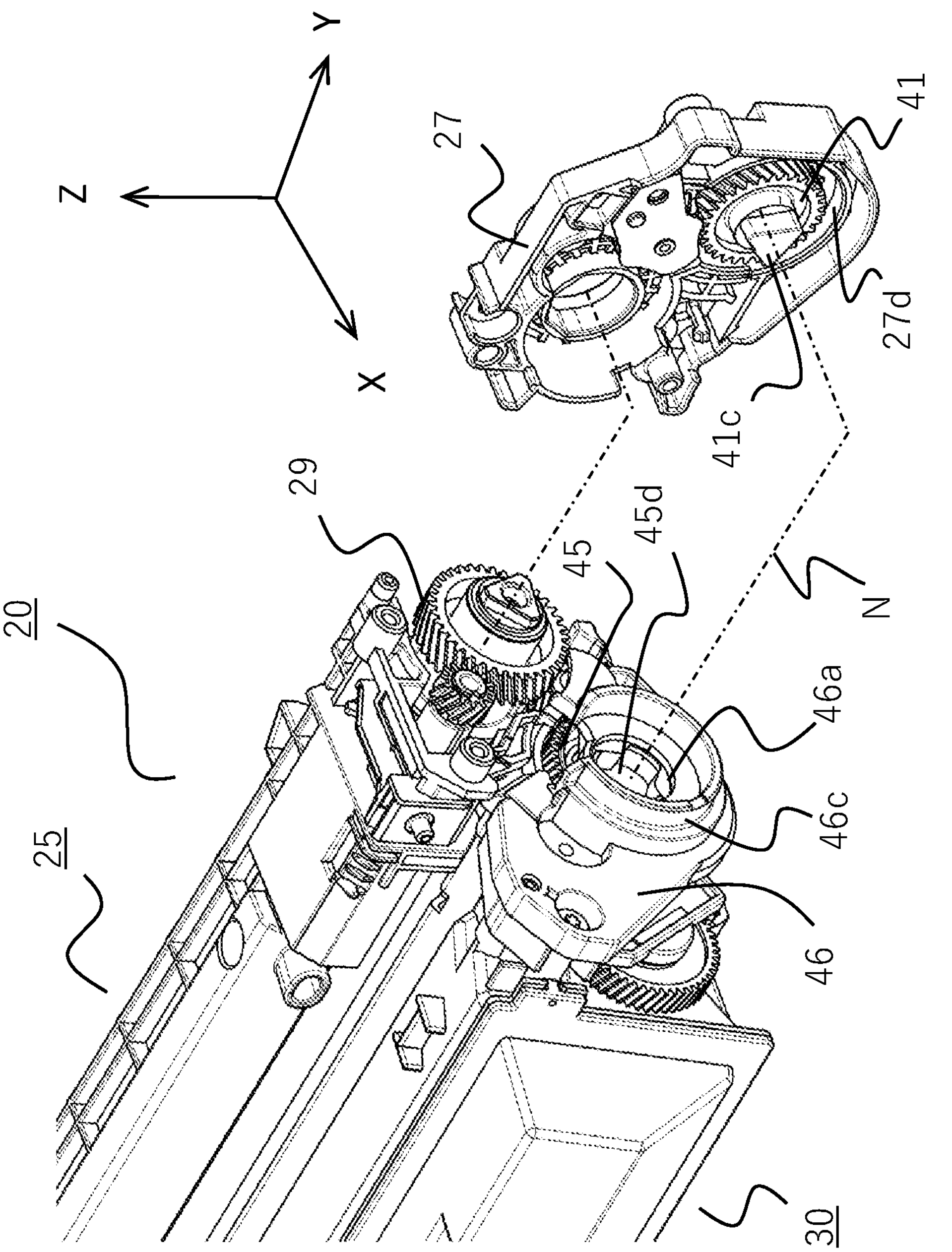
FIG. 9A is an exploded perspective view of the process cartridge according to the first embodiment.
Figure 9B:
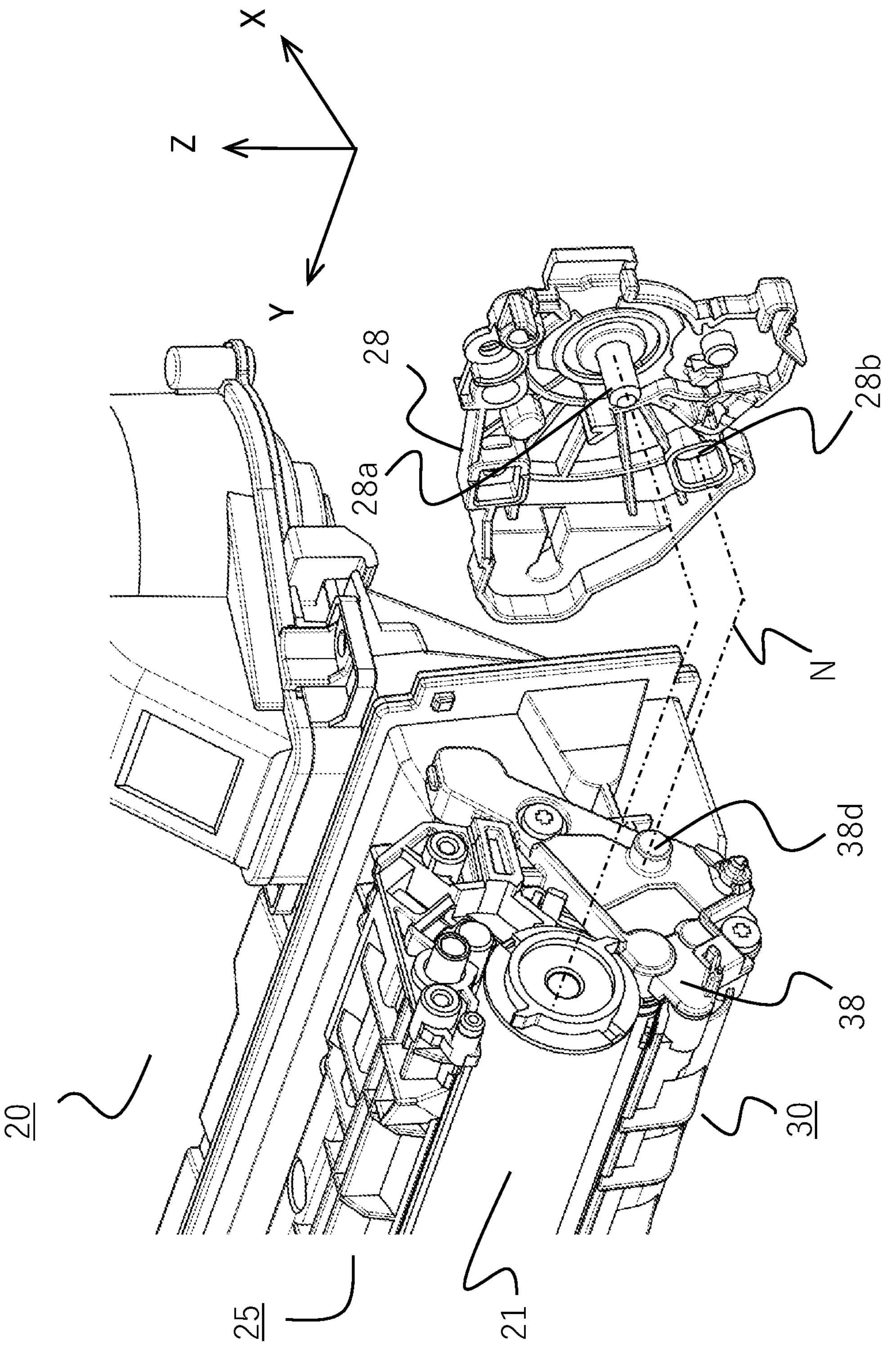
FIG. 9B is an exploded perspective view of the process cartridge according to the first embodiment.

Referring to FIGS. 9A and 9B, a configuration is now described in which the drum unit 25 and the developing unit 30 are combined. FIGS. 9A and 9B are exploded perspective views of the process cartridge 20. FIG. 9A shows how the drive-side cover member 27 is attached, and FIG. 9B shows how the non-drive-side cover member 28 is attached. The rotational center of the development driving member 45 rotatably supported by the developing unit 30 is referred to as the developing rotation axis N.

As shown in FIG. 9A, the developing cover member 46 fixed to the developing unit 30 has an annular support portion 46*c*. The annular support portion 46*c* is coaxial with the hole 46*a* that supports the development driving member 45, and the center of the annular support portion 46*c* coincides with the developing rotation axis N. Also, as shown in FIG. 9B, the non-drive-side bearing 38 fixed to the developing container 32 has a columnar support portion 38*d*, the center of which coincides with the developing rotation axis N.

The developing unit 30 is joined to the drum unit 25 so as to be movable relative to the drum unit 25. As shown in FIG. 9A, the annular support portion 46*c* engages with a developing support portion 27*d* of the drive-side cover member 27. As shown in FIG. 9B, the support portion 38*d* engages with a developing support portion 28*b*, which has the shape of an elongate hole, of the non-drive-side cover member 28. As a result, the developing unit 30 rotatably supported by the drive-side cover member 27 and the non-drive-side cover member 28 is rotatable relative to the drum unit 25 about the developing rotation axis N as the rotational center. The rotational center of the development driving member 45 coincides with the rotational center of the developing unit 30 on the developing rotation axis N. Additionally, the rotational centers of the development driving member 45 and the transmission member 41 also coincide on the developing rotation axis N, and the coupling portion 41*c* of the transmission member 41 engages with the coupling portion 45*d* of the development driving member 45, allowing a rotational force to be transmitted from the transmission member 41 to the development driving member 45.

Rotational Force Transmission Path

Figure 1B:
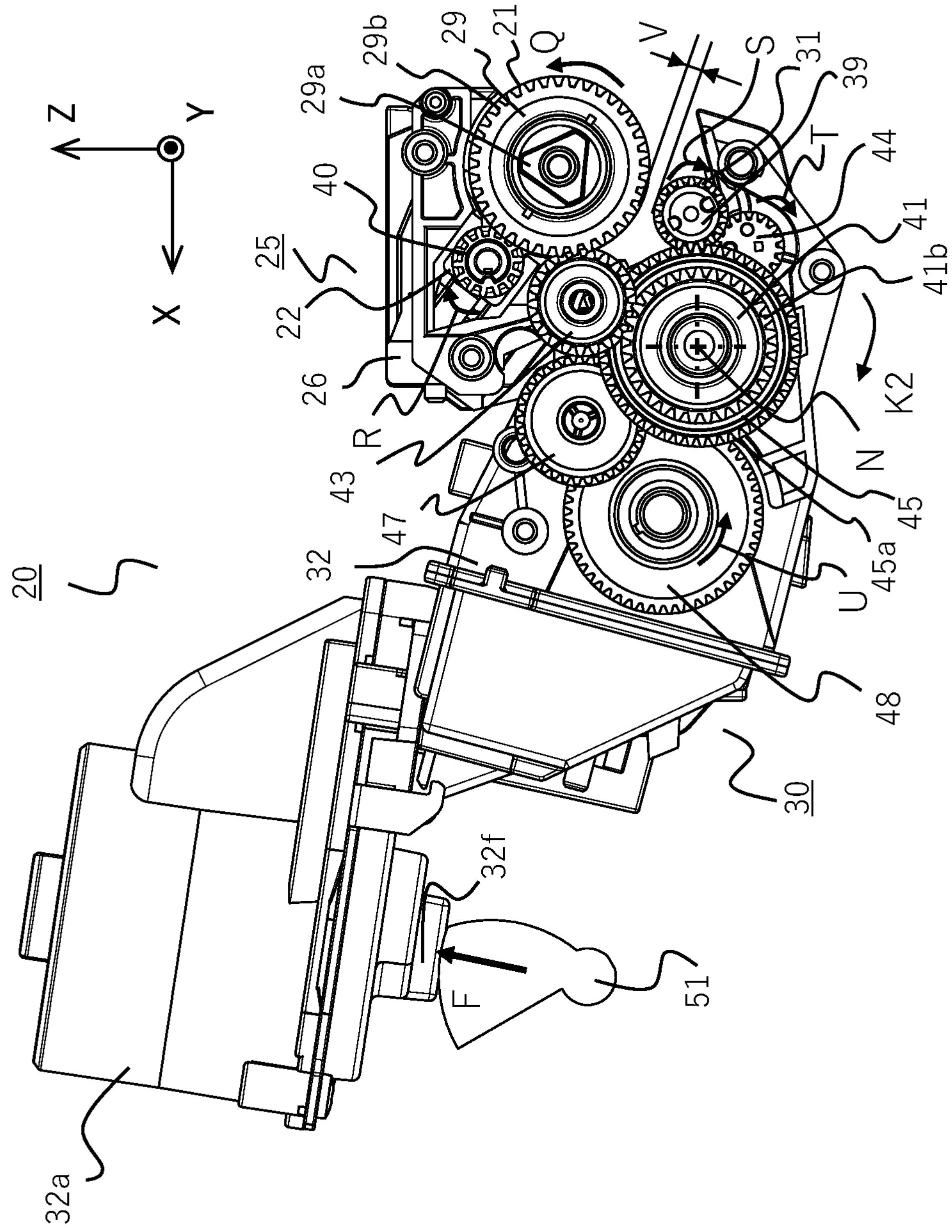
FIG. 1B is a side view of the process cartridge according to the first embodiment.

Referring to FIG. 1, the rotational force transmission path of the process cartridge 20 is now described in more detail. FIGS. 1A and 1B are side views of the process cartridge 20 placed in the apparatus main body 1 as viewed from the side on which the drum driving member 29 is placed (drive side, +Y direction end) in the longitudinal direction (rotation axis direction, Y direction) of the photosensitive drum 21. FIG. 1A shows a state where the developing unit 30 is located in a development position (first position) in which the developing roller 31 is in contact with the photosensitive drum 21. FIG. 1B shows a state where the developing unit 30 is located in a retraction position (second position) in which the developing roller 31 is spaced from the photosensitive drum 21. FIGS. 1A and 1B do not show the drive-side cover member 27, the non-drive-side cover member 28, the drive-side bearing 37, or the developing cover member 46.

The developing unit 30 is supported so as to be rotatable relative to the drum unit 25 about the developing rotation axis N in FIGS. 1A and 1B. In other words, the developing unit 30 can swing about the developing rotation axis (axis) N relative to the drum unit 25 so as to move between the development position and the retraction position. As shown in FIG. 1A, when the developing unit 30 is in the development position, the developing roller 31 is in contact with the photosensitive drum 21 and can develop the latent image on the surface of the photosensitive drum 21. A retraction cam 51 is placed in the apparatus main body 1 below the toner receiving portion 32*a*. When the developing unit 30 is in the development position, there is a gap H shown in FIG. 1A between the retraction cam 51 and the bottom surface 32*f* of the toner receiving portion 32*a*. Also, the developing roller gear 39 is separated from the drum driving member 29.

With the developing unit 30 located in the development position, a rotational force input to the coupling portion 29*a* of the drum driving member 29 in the direction of arrow Q in FIG. 1A (counterclockwise as viewed from the drive side in the −Y direction) rotates the photosensitive drum 21 in the direction of arrow Q in FIG. 1A. The charging roller 22, on which the charging roller gear 40 meshing with the gear portion 29*b* of the drum driving member 29 is placed, rotates in the direction of arrow R in FIG. 1A (clockwise as viewed from the drive side in the −Y direction). Also, the idler gear 43, which meshes with the gear portion 29*b* of the drum driving member 29, rotates, and the transmission member 41, which meshes with the idler gear 43, rotates about the developing rotation axis N in the direction of arrow K1 in FIG. 1A (counterclockwise as viewed from the drive side in the −Y direction). Furthermore, the coupling portion 41*c* of the transmission member 41, which engages with the coupling portion 45*d* of the development driving member 45, transmits the rotational force to the coupling portion 45*d*, so that the development driving member 45 rotates in the direction of arrow K1 in FIG. 1A (counterclockwise as viewed from the drive side in the −Y direction).

As shown in FIG. 1A, the first gear portion 45*a* of the development driving member 45, which is driven by the transmission member 41, meshes with the developing roller gear 39 to rotate the developing roller 31 in the direction of arrow S in FIG. 1A (clockwise as viewed from the drive side in the −Y direction). Also, the second gear portion 45*b* (not shown) meshes with the supply roller gear 44 to rotate the supply roller 33 (not shown) in the direction of arrow T in FIG. 1A (clockwise as viewed from the drive side in the −Y direction). The second gear portion 45*b* (not shown) also meshes with the stirring idler gear 47, which meshes with the stirring gear 48, so that the stirring gear 48 and the stirring member 34 (not shown) are rotated in the direction of arrow U in FIG. 1A (counterclockwise as viewed from the drive side in the −Y direction). In this manner, the development driving member 45 transmits the rotational force to the developing roller 31, the supply roller 33, and the stirring member 34, which are rotating members of the developing unit 30. In other words, the developing roller 31, the supply roller 33, and the stirring member 34 are rotated by the rotational force transmitted to the development driving member 45 of the developing unit 30 by the transmission member 41. This eliminates the need for a configuration for directly transmitting a rotational force from the apparatus main body 1 to the developing unit 30.

Accordingly, the rotation loads of the rotating members of the developing unit 30 are applied to the development driving member 45, and the rotation loads of the rotating members of the developing unit 30 are also applied to the transmission member 41, which rotates the development driving member 45. Additionally, the rotation loads of the rotating members of the developing unit 30 are also applied to the drum driving member 29, which rotates the transmission member 41 via the idler gear 43. As a result, the rotation load caused by the rotating members of the developing unit 30 is applied to the drum driving member 29, allowing the drum driving member 29 to rotate in a stable manner as compared with a configuration in which the drum driving member 29 rotates under light-load conditions. This stabilizes the rotation of the photosensitive drum 21.

In the first embodiment, the transmission member 41, the idler gear 43, the development driving member 45, and the stirring idler gear 47 serve as transmission means for transmitting the rotational driving force input to the photosensitive drum 21 to the developing roller 31, the supply roller 33, and the stirring member 34. The transmission means may be any configuration that transmits the rotational driving force input to the photosensitive drum 21 via the drum driving member 29 to the rotating member of at least one of the developing roller 31, the supply roller 33, and the stirring member 34. As a result, the load for rotating the rotating members is applied to the drum driving member 29, advantageously stabilizing the rotation of the photosensitive drum 21. In the first embodiment, the idler gear 43 and the transmission member 41 function as first gears that are driven and rotated by the drum driving member 29. That is, the idler gear 43 and the transmission member 41 are driven and rotated in interrelation with the rotation of the photosensitive drum 21 (the rotation of the drum driving member 29). The development driving member 45 and the stirring idler gear 47 function as second gears that are rotatably supported by the developing unit 30 and driven and rotated by the first gears. The means for transmitting the rotational driving force input to the photosensitive drum 21 to the rotating members, such as the developing roller 31, of the developing unit 30 is not limited to the above example and may be any configuration that allows the rotation loads of the rotating members to be applied to the drum driving member 29. The first embodiment illustrates an example configuration in which the transmission member 41 as the first gear is connected to the development driving member 45 as the second gear via the coupling (41*c*, 45*d*), but the form of connection is not limited to this as long as the rotational driving force can be transmitted.

The rotational force transmitted by the transmission member 41 to the development driving member 45 acts as an external force applied to the developing unit 30, causing the developing unit 30 to rotate about the developing rotation axis N in the direction of arrow K1 in FIG. 1A (counterclockwise as viewed from the drive side in the −Y direction). As a result, the developing roller 31 of the developing unit 30 receives a force acting in the counterclockwise direction about the developing rotation axis N. Thus, the developing roller 31 is pressed against the photosensitive drum 21, which is located downstream of the developing roller 31 in the counterclockwise direction about the developing rotation axis N, so that the developing roller 31 is in contact with the photosensitive drum 21. In this manner, the drum unit 25 and the developing unit 30 are joined together so as to be relatively rotatable about the axis N parallel to the rotation axis of the development driving member 45 as the second gear and between the first position in which the developing roller 31 is in contact with the photosensitive drum 21 and the second position in which the developing roller 31 is spaced from the photosensitive drum 21. The developing roller 31 is located upstream of the photosensitive drum 21 in the direction in which the development driving member 45 as the second gear rotates when a rotational driving force is transmitted by the transmission member 41 and the development driving member 45, which are transmission means. Thus, when a rotational driving force is input to the drum driving member 29, a force that urges the developing roller 31 toward the photosensitive drum 21 acts on the developing unit 30. This brings the developing roller 31 into contact with the photosensitive drum 21.

When the opening and closing member 83 shown in FIG. 2B is moved from the closed position to the open position, the retraction cam 51 moves in the direction of arrow J in FIG. 1A (clockwise as viewed from the drive side in the −Y direction) in conjunction with the opening and closing member 83. This brings the retraction cam 51 into contact with the bottom surface 32*f* of the toner receiving portion 32*a* as shown in FIG. 1B. The bottom surface 32*f* is thus pressed in the direction of arrow F in FIG. 1B (the direction perpendicular to the bottom surface 320, the developing unit 30 rotates about the developing rotation axis N in the direction of arrow K2 in FIG. 1B (clockwise as viewed from the drive side in the −Y direction), and the developing unit 30 moves to the retraction position. At this time, as shown in FIG. 1B, a gap V is formed between the developing roller 31 and the photosensitive drum 21, separating the developing roller 31 from the photosensitive drum 21. The retraction cam 51 is an interlocking mechanism that moves the developing unit 30 relative to the drum unit 25 between the first position (development position) and the second position (retraction position) in conjunction with the opening and closing of the opening and closing member 83. When the opening and closing member 83 opens the opening portion 82*a*, the retraction cam 51 moves the developing unit 30 to the second position. When the opening and closing member 83 closes the opening portion 82*a*, the developing unit 30 moves to the first position.

When the developing unit 30 is in the retraction position, the meshing relationship between the gear portions of the drum unit 25 and the developing unit 30 remains unchanged. The engagement between the transmission member 41 and the development driving member 45 is maintained while the developing unit 30 moves between the development position and the retraction position. That is, the developing unit 30 moves between the development position and the retraction position with the transmission member 41 and the development driving member 45 remaining engaged. When the developing unit 30 is in the retraction position, in the same manner as when the developing unit 30 is in the development position, the coupling portion 41*c* of the transmission member 41 engages with the coupling portion 45*d* of the development driving member 45, allowing the transmission member 41 to drive the development driving member 45. As such, the rotational force input to the drum driving member 29 in the direction of arrow Q in FIG. 1B (counterclockwise as viewed from the drive side in the −Y direction) is transmitted to the development driving member 45 from the transmission member 41 in the same manner as when the developing unit 30 is in the development position. The rotational force is then transmitted to the rotating members (the developing roller 31, the supply roller 33, and the stirring member 34) placed in the developing unit 30. That is, the transmission member 41 can transmit the rotational force to the developing unit 30 in the development position and the developing unit 30 in the separated position.

As a result, even when the developing unit 30 is located in the retraction position and the developing roller 31 is separated from the photosensitive drum 21, the loads of the rotating members of the developing unit 30 are applied to the drum driving member 29, allowing the photosensitive drum 21 to rotate in a stable manner. The configuration also allows the rotational force to be transmitted to the rotating members of the developing unit 30 with the developing roller 31 separated from the photosensitive drum 21. As such, the toner added to the toner containing chamber 36 from the toner receiving portion 32*a* is stirred by the stirring member 34 and supplied to the supply roller 33 and the developing roller 31 without causing deterioration of the developing roller 31, which would otherwise occur due to friction with the photosensitive drum 21. Furthermore, the developing roller 31 may be brought into contact with the photosensitive drum 21 while the photosensitive drum 21 is rotating. In this case, the rotation of the photosensitive drum 21 rotates the developing roller 31, allowing the developing roller 31 to be in contact with the photosensitive drum 21 while rotating.

The first embodiment illustrates a configuration in which a rotational force is input to the development driving member 45 of the developing unit 30 via the transmission member 41 to rotate the developing unit 30 relative to the drum unit 25, thereby bringing the developing roller 31 into contact with the photosensitive drum 21. However, the configuration for bringing the developing roller 31 into contact with the photosensitive drum 21 is not limited to this. For example, a configuration may be contemplated that uses a spring to urge the developing unit 30 toward the drum unit 25 to bring the developing roller 31 into contact with the photosensitive drum 21. This configuration is described below with reference to FIG. 10.

Figure 10:
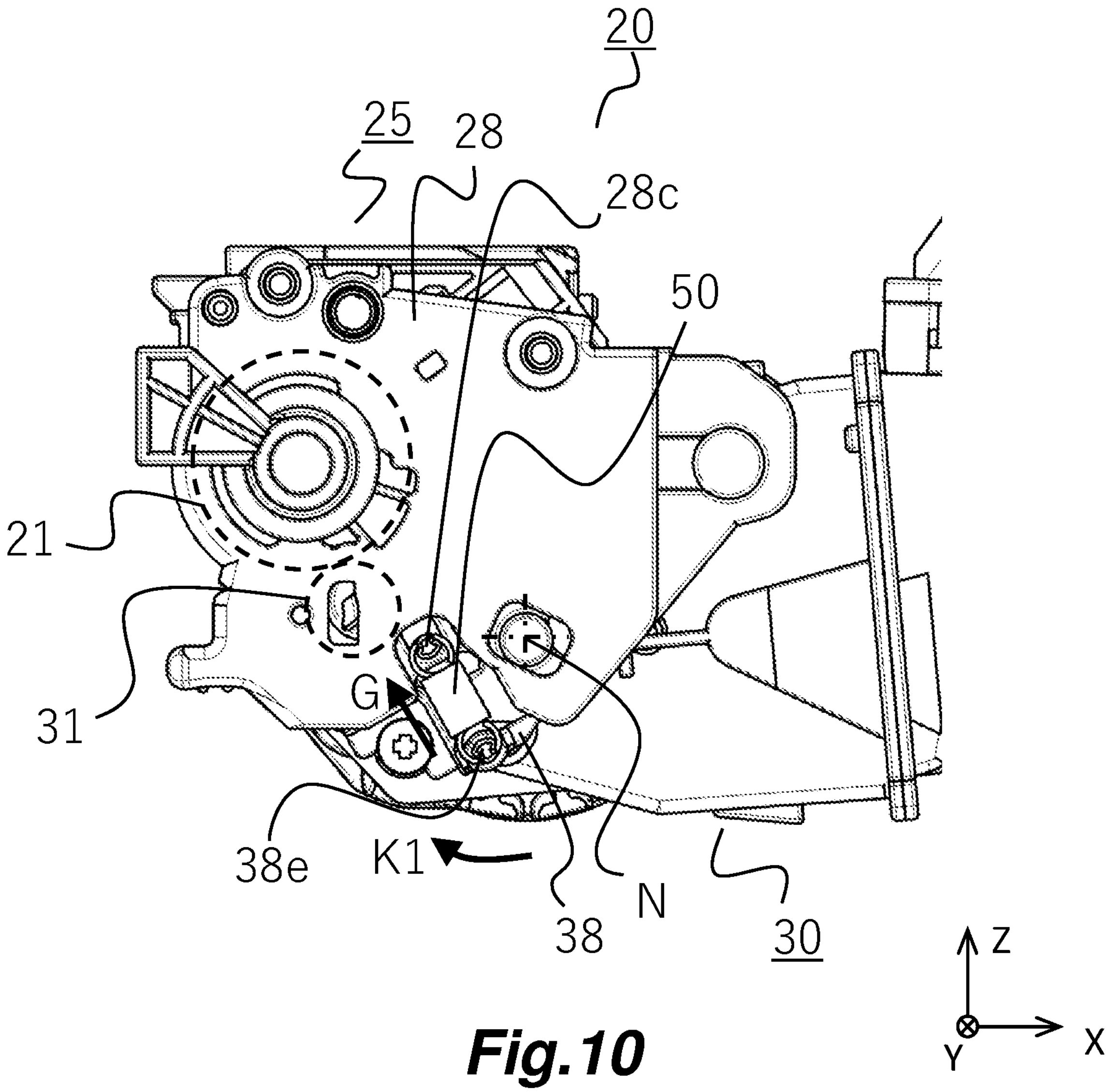
FIG. 10 is a side view of a process cartridge according to a modification of the first embodiment.

FIG. 10 is a side view of the process cartridge 20 placed in the apparatus main body 1, as viewed in a direction along the rotation axis of the photosensitive drum 21 (Y direction) from the side on which the non-drive-side cover member 28 is placed. The non-drive-side cover member 28 of the drum unit 25 has a protruding spring hook portion 28*c*, and the non-drive-side bearing 38 of the developing unit 30 has a protruding spring hook portion 38*e*. A development pressurizing spring 50 is placed on the spring hook portions 28*c* and 38*e*, so that a force acts on the developing unit 30 in the direction of arrow G in FIG. 10 (the direction that urges the developing unit 30 clockwise about the developing rotation axis N). The developing unit 30 receives the force in the direction of arrow G in FIG. 10 and rotates about the developing rotation axis N in the direction of arrow K1 in FIG. 10 (clockwise as viewed from the non-drive side in the +Y direction), so that the developing roller 31 of the developing unit 30 is in contact with the photosensitive drum 21. As described above, instead of transmitting the rotational force to the development driving member 45, a spring may be used to generate contact pressure that brings the developing roller 31 into contact with the photosensitive drum 21.

Second Embodiment

A process cartridge and an image forming apparatus according to a second embodiment of the present invention are now described. In the second embodiment, members having the same functions and configurations as those in the first embodiment are denoted by the same reference numerals as those in the first embodiment, and a detailed description thereof will be omitted.

Figure 11:
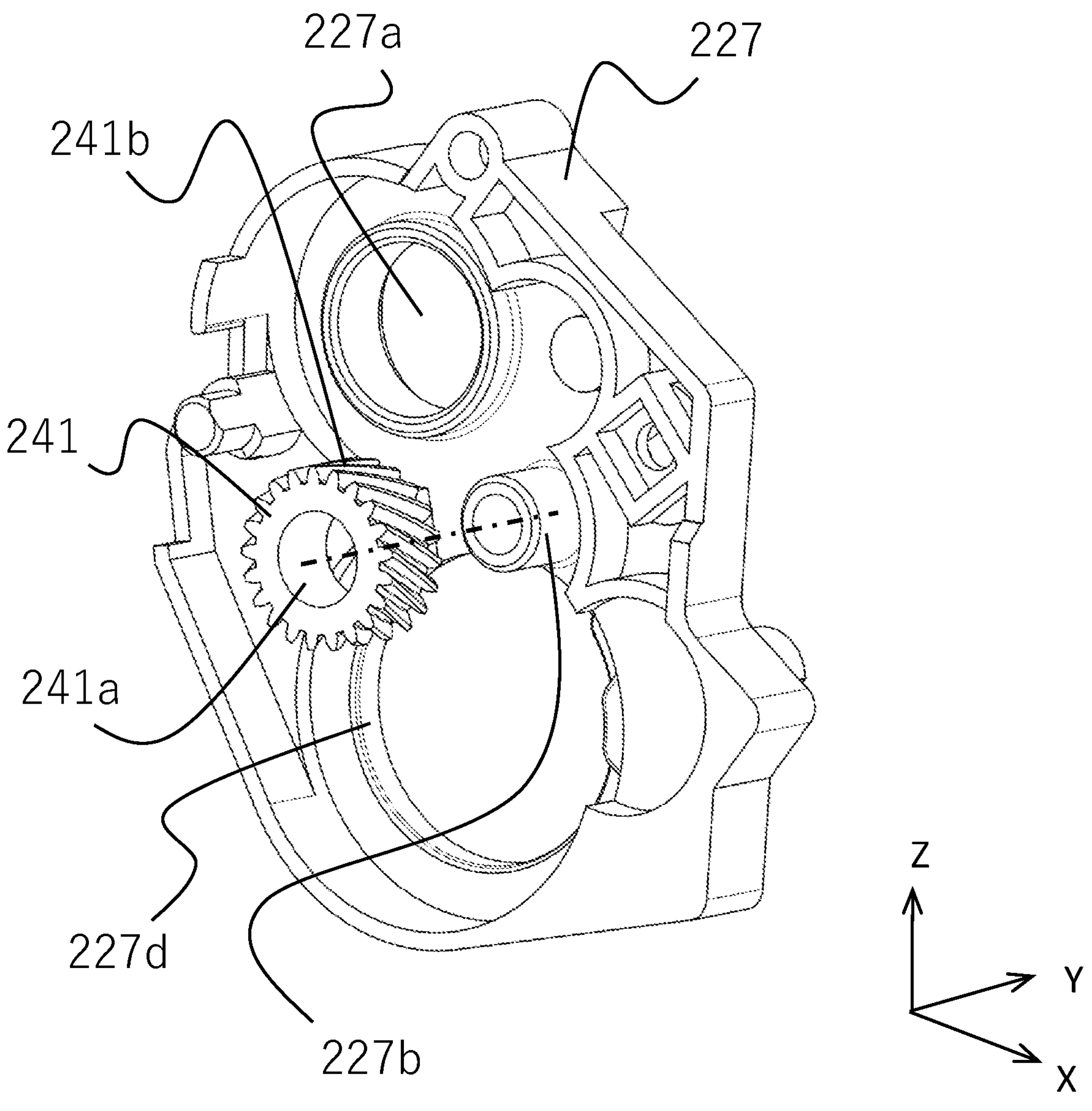
FIG. 11 is an exploded perspective view of a drive-side cover member according to a second embodiment.

FIG. 11 is an exploded perspective view of a drive-side cover member 227. The drive-side cover member 227 has a columnar support portion 227*b*. The support portion 227*b* is fitted in a hole 241*a* of a transmission member 241 to support the transmission member 241. The transmission member 241 rotatably supported by the support portion 227*b* includes a gear portion 241*b* that transmits a rotational force to the developing unit 30.

Figure 12A:
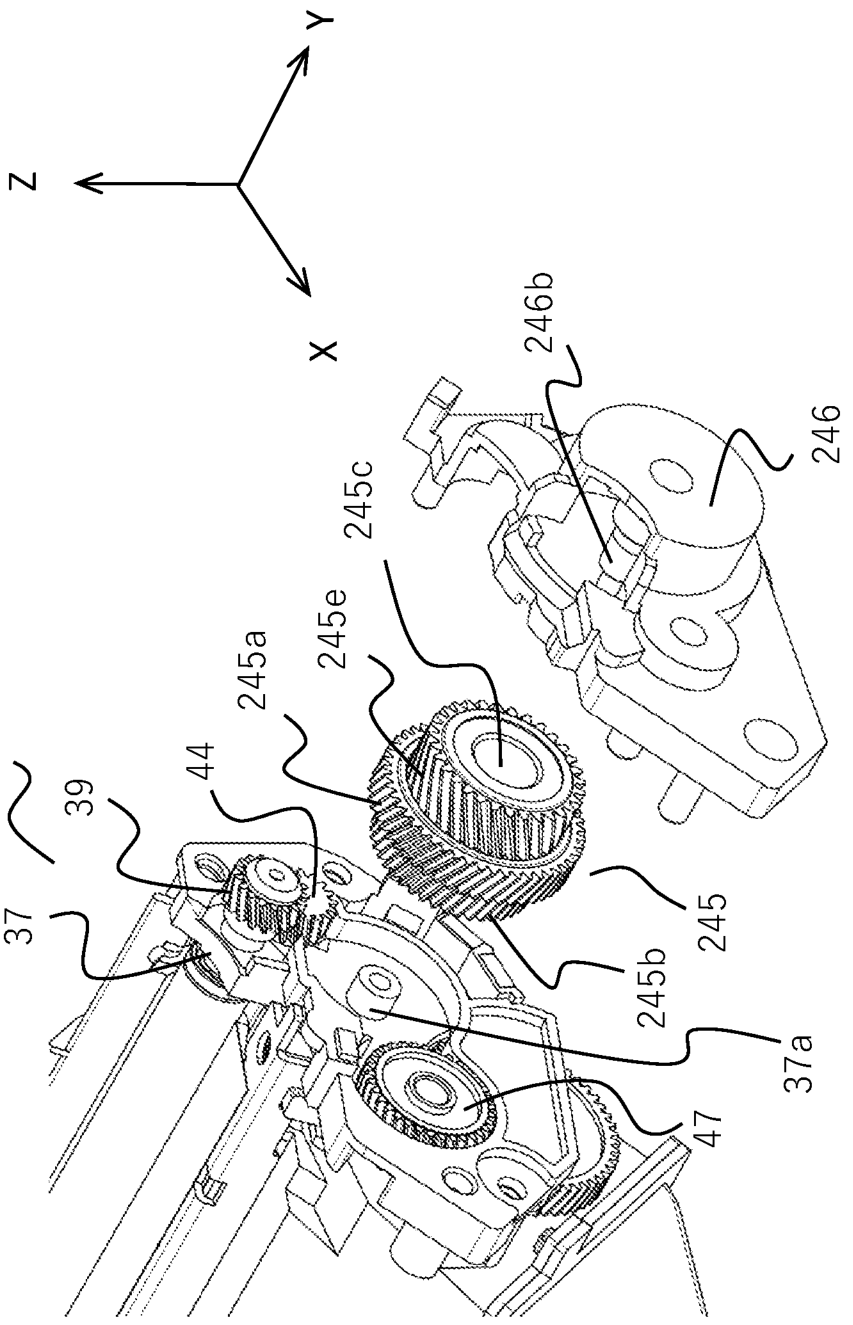
FIG. 12A is an exploded perspective view of a developing unit according to the second embodiment.
Figure 12B:
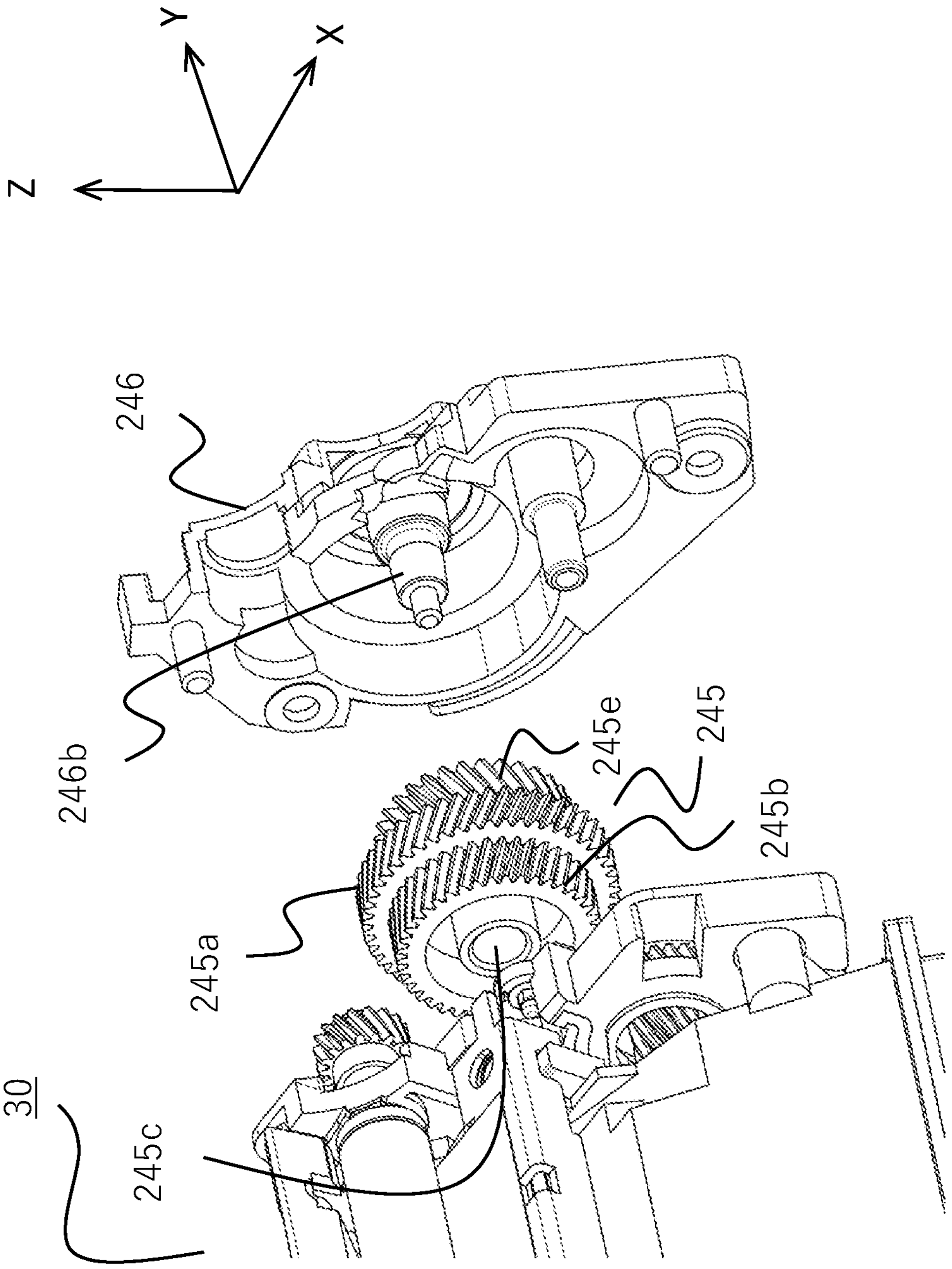
FIG. 12B is an exploded perspective view of the developing unit according to the second embodiment.

FIGS. 12A and 12B are exploded perspective views of the developing unit 30 according to the second embodiment. A development driving member (transmitted member, driven member) 245 includes a first gear portion 245*a* and a second gear portion 245*b*. As in the first embodiment, the first gear portion 245*a* meshes with the developing roller gear 39, and the second gear portion 245*b* meshes with the supply roller gear 44 and the stirring idler gear 47 to transmit a rotational force. The development driving member 245 also includes a third gear portion 245*e*, which meshes with the gear portion 241*b* of the transmission member 241 and transmits a rotational force. The development driving member 245 has a hole 245*c*, which fits the support portion 37*a* of the drive-side bearing 37 and the columnar support portion 246*b* of the developing cover member 246, so that the development driving member 245 is rotatably supported.

Figure 13:
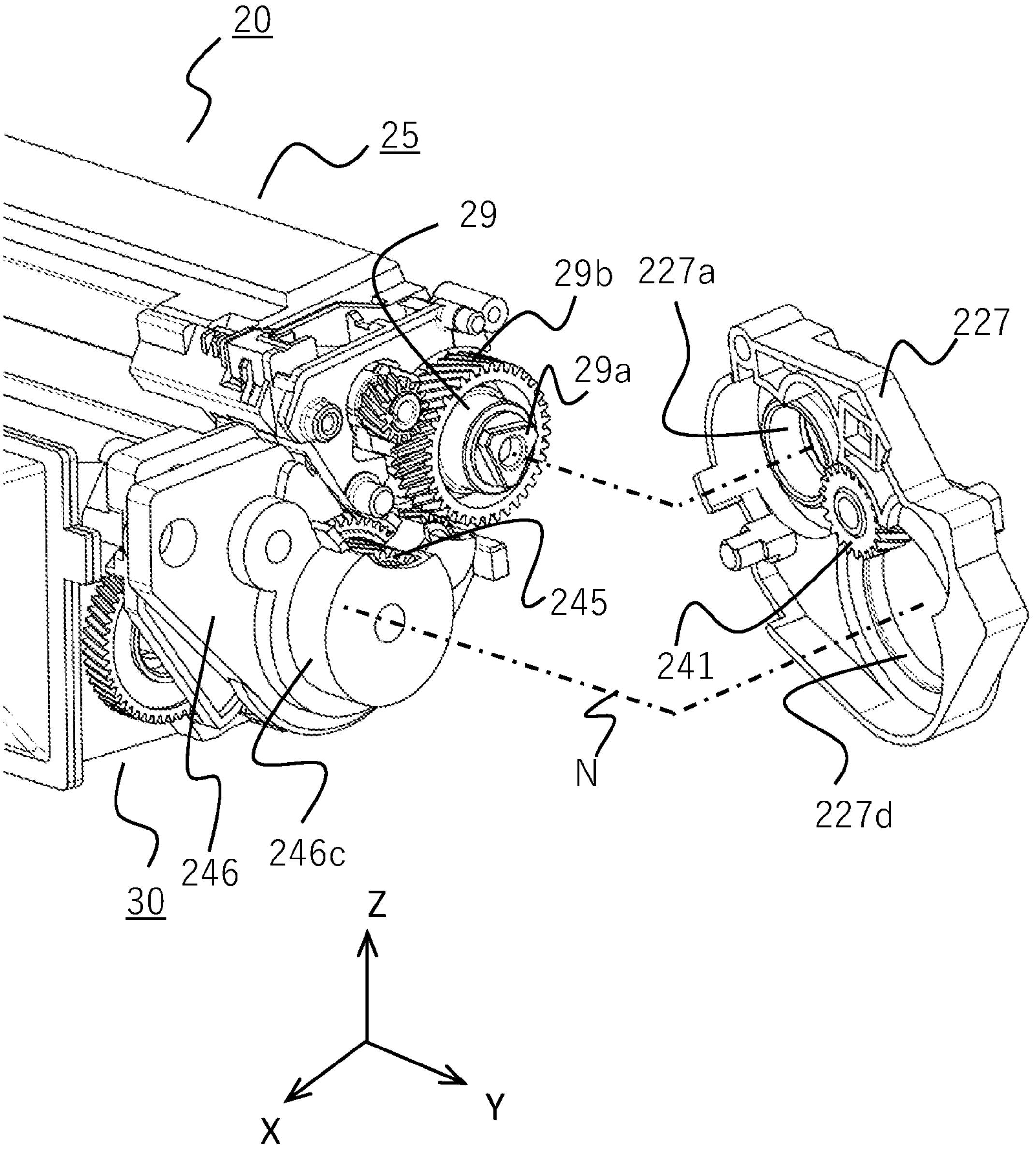
FIG. 13 is an exploded perspective view of a process cartridge according to the second embodiment.

Referring to FIG. 13, a configuration is now described in which the drum unit 25 and the developing unit 30 are combined. FIG. 13 is an exploded perspective view of the process cartridge 20 according to the second embodiment. The rotational center of the development driving member 245, which is rotatably supported, is referred to as a developing rotation axis N as in the first embodiment. The developing cover member 246 fixed to the developing unit 30 has a columnar support portion 246*c*. The columnar support portion 246*c* is coaxial with the support portion 246*b*, which supports the development driving member 245 and is shown in FIG. 12B, and the center of the columnar support portion 246*c* coincides with the developing rotation axis N. The columnar support portion 246*c* engages with the developing support portion 227*d* of the drive-side cover member 227, the developing unit 30 is thus supported so as to be rotatable relative to the drum unit 25 about the developing rotation axis N as the rotational center in the same manner as the first embodiment. The rotational center of the development driving member 245 coincides with the rotational center of the developing unit 30 on the developing rotation axis N. As in the first embodiment, the support hole 227*a* of the drive-side cover member 227 fits the outer circumference of the coupling portion 29*a* of the drum driving member 29, and the drive-side cover member 227 supports the photosensitive drum 21 on which the drum driving member 29 is placed. The gear portion 29*b* of the drum driving member 29 meshes with the gear portion 241*b* of the transmission member 241, and the gear portion 241*b* of the transmission member 241 meshes with the third gear portion 245*e* of the development driving member 245. That is, the rotational force input to the drum driving member 29 is transmitted to the development driving member 245 via the transmission member 241.

Figure 14A:
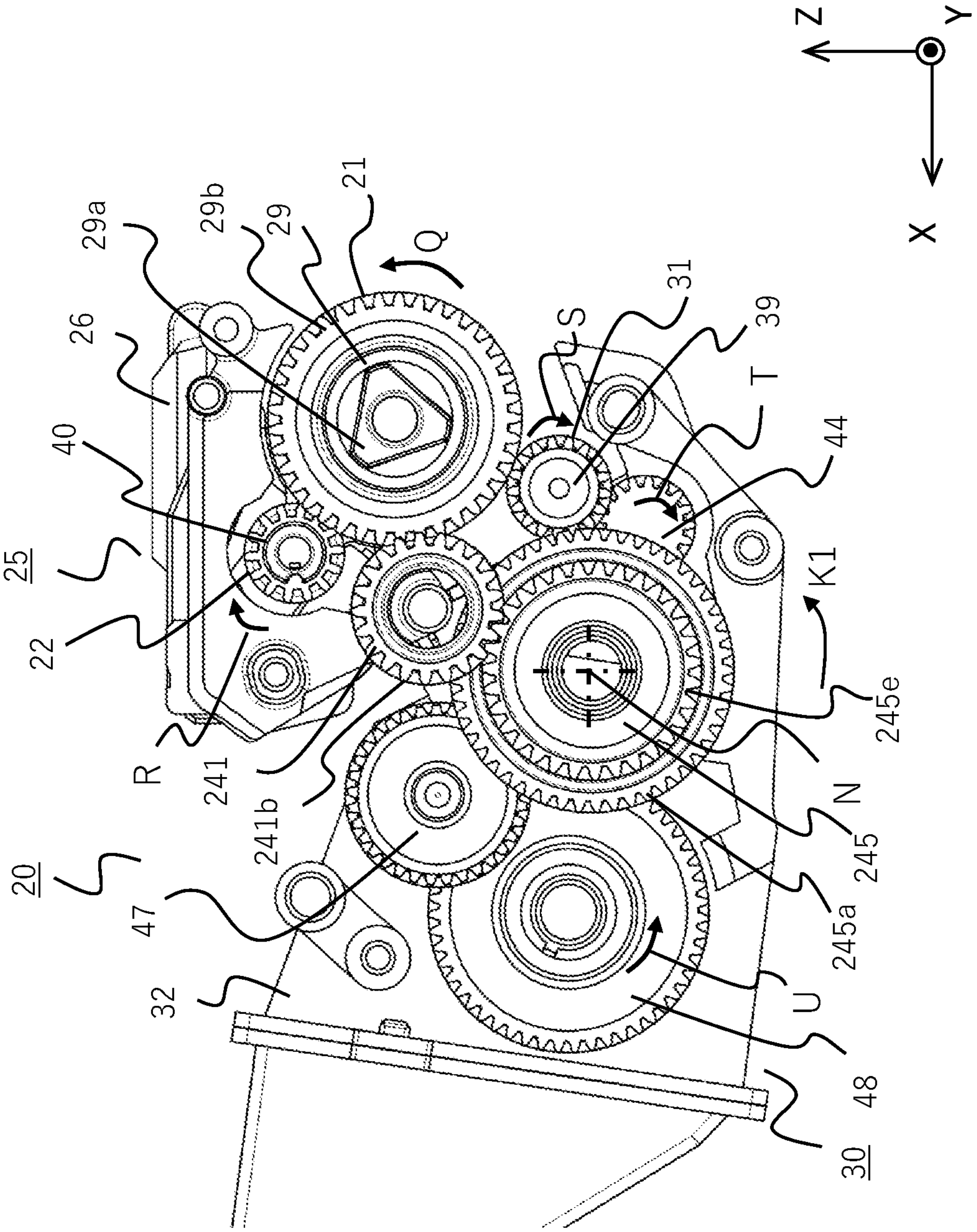
FIG. 14A is a side view of the process cartridge according to the second embodiment.
Figure 14B:
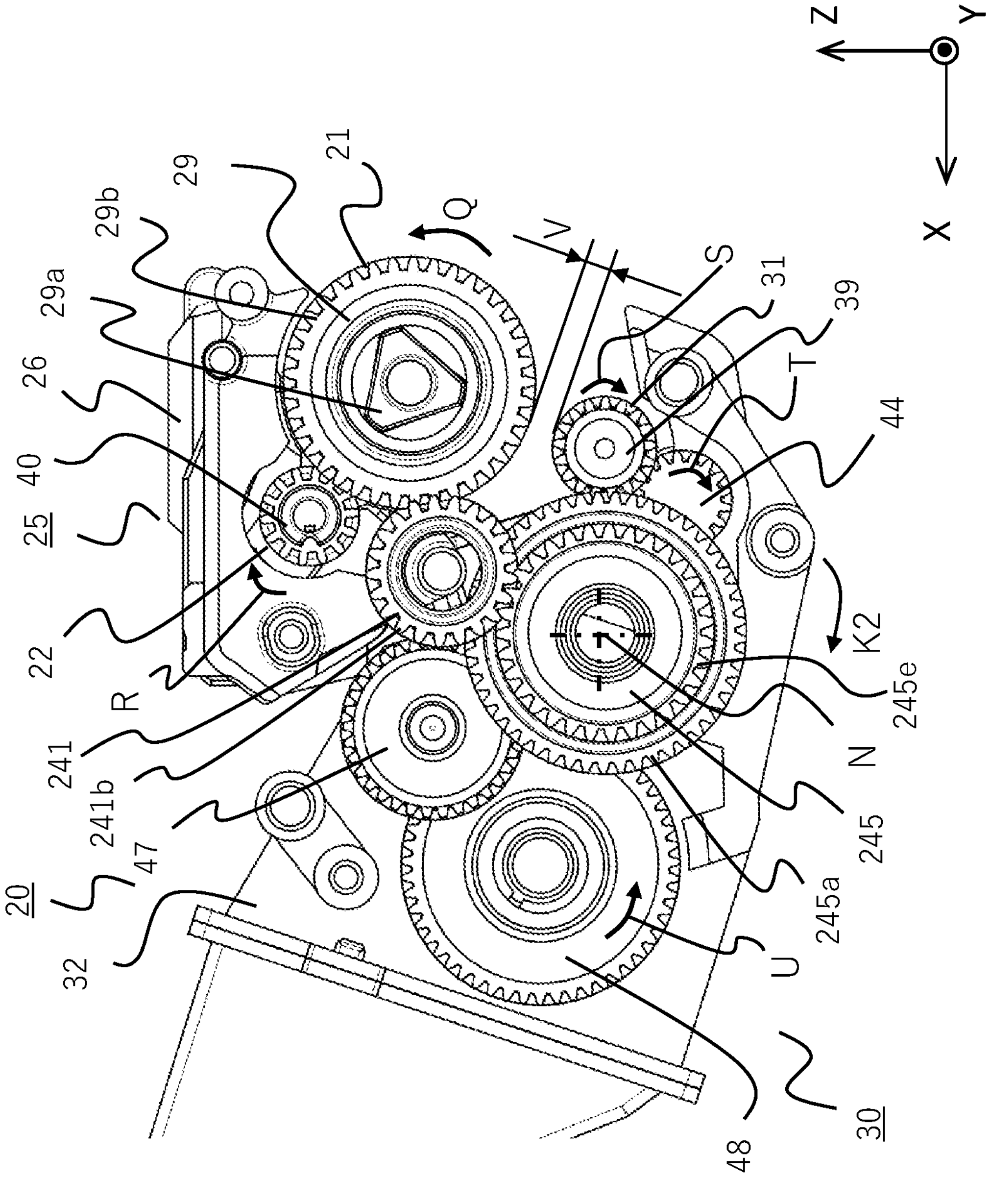
FIG. 14B is a side view of the process cartridge according to the second embodiment.

Referring to FIGS. 14A and 14B, the rotational force transmission path of the process cartridge 20 of the second embodiment is now described in more detail. FIGS. 14A and 14B are side views of the process cartridge 20 placed in the apparatus main body 1 as viewed from the side on which the drum driving member 29 is placed (drive side, +Y direction end) in the longitudinal direction of the photosensitive drum 21 (rotation axis direction, Y direction). FIG. 14A shows a state where the developing unit 30 is located in a development position in which the developing roller 31 is in contact with the photosensitive drum 21. FIG. 14B shows a state where the developing unit 30 is located in a retraction position in which the developing roller 31 is spaced from the photosensitive drum 21. FIGS. 14B and 14B do not show the drive-side cover member 227, the non-drive-side cover member 28, the drive-side bearing 37, or the developing cover member 246.

As shown in FIG. 14A, with the developing unit 30 located in the development position, a rotational force is input to the coupling portion 29*a* of the drum driving member 29 in the direction of arrow Q in FIG. 14A (counterclockwise as viewed from the drive side in the −Y direction). This rotates the photosensitive drum 21, on which the drum driving member 29 is placed, in the direction of arrow Q in FIG. 14A (counterclockwise as viewed from the drive side in the −Y direction). The charging roller gear 40, which meshes with the gear portion 29*b* of the drum driving member 29, and the charging roller 22, on which the charging roller gear 40 is placed, rotate in the direction of arrow R in FIG. 14A (clockwise as viewed from the drive side in the −Y direction). Furthermore, the gear portion 29*b* of the drum driving member 29 meshes with the gear portion 241*b* of the transmission member 241, rotating the transmission member 241. The gear portion 241*b* of the transmission member 241 meshes with the third gear portion 245*e* of the development driving member 245, and the development driving member 245 rotates about the developing rotation axis N in the direction of arrow K1 in FIG. 14A (counterclockwise as viewed from the drive side in the −Y direction). That is, the transmission member 241 is configured to transmit the rotational force received by the drum driving member 29 to the development driving member 245 of the developing unit 30.

As in the first embodiment, the first gear portion 245*a* of the development driving member 245, which is driven by the transmission member 241, transmits the rotational force to the developing roller gear 39, rotating the developing roller 31 in the direction of arrow S in FIG. 14A (clockwise as viewed from the drive side in the −Y direction). Also, the second gear portion 245*b* of the development driving member 245 transmits the rotational force to the supply roller gear 44 and the stirring idler gear 47, thereby rotating the supply roller 33 in the direction of arrow T in FIG. 14A (clockwise as viewed from the drive side in the −Y direction). Additionally, the stirring member 34 is rotated in the direction of arrow U in FIG. 14A (counterclockwise as viewed from the drive side in the −Y direction).

Accordingly, as in the first embodiment, the rotation loads of the rotating members of the developing unit 30 are applied to the development driving member 245, and the rotation loads of the rotating members of the developing unit 30 are also applied to the transmission member 241, which rotates the development driving member 245. Furthermore, the rotation loads of the rotating members of the developing unit 30 are also applied to the drum driving member 29, which rotates the transmission member 241. As a result, the rotation loads caused by the rotating members of the developing unit 30 are applied to the drum driving member 29, allowing the drum driving member 29 to rotate in a stable manner as compared with a configuration in which the drum driving member 29 rotates under light-load conditions. This stabilizes the rotation of the photosensitive drum 21.

In the second embodiment, the transmission member 241, the development driving member 245, and the stirring idler gear 47 serve as transmission means for transmitting the rotational driving force input to the photosensitive drum 21 via the drum driving member 29 to the developing roller 31, the supply roller 33, and the stirring member 34. The transmission means may be any configuration that transmits the rotational driving force input to the photosensitive drum 21 via the drum driving member 29 to the rotating member of at least one of the developing roller 31, the supply roller 33, and the stirring member 34. As a result, the load for rotating the rotating members is applied to the drum driving member 29, advantageously stabilizing the rotation of the photosensitive drum 21. In the second embodiment, the transmission member 241 functions as the first gear that is driven and rotated by the drum driving member 29. That is, the transmission member 241 is driven and rotated in interrelation with the rotation of the photosensitive drum 21 (the rotation of the drum driving member 29). Additionally, the development driving member 245 and the stirring idler gear 47 function as the second gears that are rotatably supported by the developing unit 30 and driven and rotated by the first gear. The means for transmitting the rotational driving force input to the photosensitive drum 21 to the rotating members, such as the developing roller 31, of the developing unit 30 is not limited to the above example and may be any configuration that allows the rotation loads of the rotating members to be applied to the drum driving member 29.

As in the first embodiment, the developing unit 30 receives a rotational force as an external force in the direction of arrow K1 in FIG. 14A (counterclockwise as viewed from the drive side in the −Y direction). This rotates the developing unit 30 about the developing rotation axis N in the direction of arrow K1 in 14A (counterclockwise as viewed from the drive side in the −Y direction). As a result, a counterclockwise force acts about the developing rotation axis N. Thus, the developing roller 31 is pressed against the photosensitive drum 21, which is located downstream of the developing roller 31 in the counterclockwise direction about the developing rotation axis N, so that the developing roller 31 is in contact with the photosensitive drum 21. In this manner, the drum unit 25 and the developing unit 30 are joined together so as to be relatively rotatable about the axis N parallel to the rotation axis of the development driving member 245 as the second gear and between the first position in which the developing roller 31 is in contact with the photosensitive drum 21 and the second position in which the developing roller 31 is spaced from the photosensitive drum 21. The developing roller 31 is located upstream of the photosensitive drum 21 in the direction in which the development driving member 245 as the second gear rotates when a rotational driving force is transmitted by the transmission member 241 and the development driving member 245, which are transmission means. Thus, when a rotational driving force is input to the drum driving member 29, a force that urges the developing roller 31 toward the photosensitive drum 21 acts on the developing unit 30. This brings the developing roller 31 into contact with the photosensitive drum 21.

FIG. 14B shows a state in which the bottom surface 32*f* of the toner receiving portion 32*a* of the developing unit 30 is pressed upward by the retraction cam 51 (not shown in FIG. 14B) having the same configuration as in FIGS. 1A and 1B in the same manner as the first embodiment. The retraction cam 51 rotates the developing unit 30 about the developing rotation axis N in the direction of arrow K2 in FIG. 1B (clockwise as viewed from the drive side in the −Y direction) and thus moves the developing unit 30 to the retraction position. At this time, a gap V is formed between the developing roller 31 and the photosensitive drum 21, separating the developing roller 31 from the photosensitive drum 21.

As in the first embodiment, when the developing unit 30 is in the retraction position, the meshing relationship between the gear portions of the drum unit 25 and the developing unit 30 remains unchanged. The engagement between the transmission member 241 and the development driving member 245 is maintained while the developing unit 30 moves between the development position and the retraction position. That is, the developing unit 30 moves between the development position and the retraction position with the transmission member 241 and the development driving member 245 remaining engaged. When the developing unit 30 is in the retraction position, in the same manner as when the developing unit 30 is in the development position, the gear portion 241*b* of the transmission member 241 engages (meshes) with the third gear portion 245*e* of the development driving member 245, allowing the transmission member 241 to drive the development driving member 245. As such, the rotational force input to the drum driving member 29 in the direction of arrow Q in FIG. 14B (counterclockwise as viewed from the drive side in the −Y direction) is transmitted to the development driving member 245 from the transmission member 241 in the same manner as when the developing unit 30 is in the development position. The rotational force is then transmitted to the rotating members placed in the developing unit 30. That is, the transmission member 241 can transmit the rotational force to the developing unit 30 in the development position and the developing unit 30 in the separated position.

As a result, even when the developing unit 30 is located in the retraction position and the developing roller 31 is separated from the photosensitive drum 21, the loads of the rotating members of the developing unit 30 are applied to the drum driving member 29, allowing the photosensitive drum 21 to rotate in a stable manner. The configuration also allows the rotational force to be transmitted to the rotating members of the developing unit 30 with the developing roller 31 separated from the photosensitive drum 21. As such, the toner added to the toner containing chamber 36 from the toner receiving portion 32*a* is stirred by the stirring member 34 and supplied to the supply roller 33 and the developing roller 31 without causing deterioration of the developing roller 31, which would otherwise occur due to friction with the photosensitive drum 21. As compared with the first embodiment, the second embodiment can omit the idler gear 43, resulting in a simpler configuration and improved assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-194744, filed on Nov. 30, 2021, which is hereby incorporated by reference herein in its entirety.

What is claimed is:

1. An image forming apparatus to which a toner container can be attached, the image forming apparatus comprising:

a process unit including:

a photosensitive member unit including a photosensitive member on which an electrostatic latent image is to be formed, a developing unit configured to receive toner from the toner container, the developing unit including (i) a developing roller configured to develop the electrostatic latent image with the toner, (ii) a toner chamber configured to accommodate the toner from the toner container, and (iii) a stirring member configured to stir the toner in the toner chamber, a drive receiving portion configured to receive a driving force, and a transmission member configured to transmit the driving force received by the drive receiving portion to the stirring member;

an apparatus main body that accommodates the process unit, the apparatus main body including (i) an attachment portion to which the toner container can be attached and (ii) a door, the door configured to be movable between a closed position covering the attachment portion so that the toner container cannot be attached to the apparatus main body, and an open position exposing the attachment portion so that the toner container can be attached to the apparatus main body, wherein in a state where the door is in the open position, the driving force is transmitted to the stirring member so that the stirring member is driven.

2. The image forming apparatus according to claim 1, wherein the developing unit is joined to the photosensitive member unit so as to be movable relative to the photosensitive member unit and includes a driven member configured to be driven by the transmission member, and wherein the stirring member is configured to be driven by the driven member.

3. The image forming apparatus according to claim 2, wherein the developing unit is configured to be movable relative to the photosensitive member unit between a first position in which the developing roller is in contact with the photosensitive member and a second position retracted from the first position.

4. The image forming apparatus according to claim 3, wherein the developing unit is configured to swing about an axis to move between the first position and the second position, and the driven member is rotatable about the axis.

5. The process unit according to claim 4, wherein the transmission member is rotatable about the axis.

6. The image forming apparatus according to claim 3, wherein the transmission member is configured to engage with the driven member to drive the driven member with the developing unit located in the first position, and to engage with the driven member to drive the driven member with the developing unit located in the second position.

7. The image forming apparatus according to claim 3, wherein the apparatus main body includes an interlocking mechanism configured to move the developing unit between the first position and the second position in conjunction with opening and closing of the door.

8. The image forming apparatus according to claim 2, wherein the transmission member is a first gear that is provided in the photosensitive member unit and configured to be rotated by the drive receiving portion, and the driven member is a second gear provided in the developing unit and configured to be rotated by the first gear.

9. The image forming apparatus according to claim 8, wherein the first gear and the second gear are connected via a coupling.

10. The image forming apparatus according to claim 8, wherein the developing roller is located upstream of the photosensitive member with respect to a direction in which the second gear rotates in a case where the driving force is transmitted by the transmission member.

11. The image forming apparatus according to claim 1, wherein the developing roller is configured to be rotated by the driving force transmitted by the transmission member.

12. The image forming apparatus according to claim 1, wherein the developing unit rotatably supports a supply roller configured to supply the toner to the developing roller, and the supply roller is configured to be rotated by the driving force transmitted by the transmission member.

* * * * *